United States Patent
Li et al.

(10) Patent No.: US 8,849,131 B2
(45) Date of Patent: Sep. 30, 2014

(54) POLARIZATION SCATTERING COMPENSATION DEVICE AND POLARIZATION SCATTERING COMPENSATION METHOD

(75) Inventors: Lei Li, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 13/458,773

(22) Filed: Apr. 27, 2012

(65) Prior Publication Data

US 2012/0275797 A1    Nov. 1, 2012

Related U.S. Application Data

(63) Continuation of application No. PCT/CN2009/074734, filed on Oct. 30, 2009.

(51) Int. Cl.
| | |
|---|---|
| H04B 10/06 | (2006.01) |
| H04B 10/12 | (2006.01) |
| H04J 14/02 | (2006.01) |
| H04B 10/2519 | (2013.01) |
| H04B 10/66 | (2013.01) |
| H04J 14/06 | (2006.01) |

(52) U.S. Cl.
CPC ........... *H04B 10/66* (2013.01); *H04J 14/06* (2013.01); *H04B 10/2519* (2013.01)
USPC ................. 398/208; 398/147; 398/81

(58) Field of Classification Search
CPC .................................. H04B 10/2572
USPC ........................ 398/147–150, 208
See application file for complete search history.

(56) References Cited

U.S. PATENT DOCUMENTS

2003/0206742 A1*  11/2003  Franz .................. 398/81

OTHER PUBLICATIONS

Japanese Office Action mailed May 21, 2013 in corresponding Japanese Patent Application No. 2012-535582.
Lei Li et al., "Nonlinear Polarization Crosstalk Canceller for Dual-Polarization Digital Coherent Receivers", Optical Fiber Communication (OFC), Collocated National Fiber Optic Engineers Conference, 2010 Conference on (OFC/NFOEC), pp. 1-3.
Japanese Office Action mailed Oct. 15, 2013 in corresponding Japanese Application No. 2012-535582.
Shoichiro Oda et al., "112 Gb/s DP-QPSK Transmission Using a Novel Nonlinear Compensator in Digital Coherent Receiver", Optical Fiber Communication-Includes Post Deadline Papers, 2009, OFC 2009 Conference, Mar. 22-26, 2009, pp. 1-3.

(Continued)

*Primary Examiner* — Ken Vanderpuye
*Assistant Examiner* — Jai Lee
(74) *Attorney, Agent, or Firm* — Staas & Halsey LLP

(57) ABSTRACT

Polarization scattering compensation device and method are disclosed. In the device, a time sequence alignment unit aligns time sequences of signals in the first and second polarization state transmitted simultaneously; a polarization scattering estimation unit estimates a scattering coefficient of a scattering by the signal in the first polarization state on the signal in the second polarization state, and a scattering coefficient of a scattering by the signal in the second polarization state on the signal in the first polarization state; and a polarization scattering removal unit removes the scattering by the signal in the first polarization state on the signal in the second polarization state, and the scattering by the signal in the second polarization state on the signal in the first polarization state, in accordance with the scattering coefficients.

10 Claims, 12 Drawing Sheets

(56) References Cited

OTHER PUBLICATIONS

Takahito Tanimura et al., "A Simple Digital Skew Compensator for Coherent Receiver", Optical Communication, 2009, ECOC '09, 35$^{th}$ European Conference, Sep. 20-24, 2009, pp. 1-2.

Andreas Leven et al., "A Real-Time CMA-Based 10 Gb/s Polarization Demultiplexing Coherent Receiver Implemented in an FPGA", Optical Fiber Communication/National Fiber Optic Engineers Conference, 2008, OFC/NFOEC 2008, Feb. 24-28, 2008, pp. 1-3.

\* cited by examiner

POLARIZATION SCATTERING COMPENSATION DEVICE AND POLARIZATION SCATTERING COMPENSATION METHOD

CROSS REFERENCE TO RELATED APPLICATIONS

This application is a continuation of and claims the benefit of International Application No. PCT/CN2009/074734, filed Oct. 30, 2009, the disclosure of which is incorporated herein by reference.

FIELD

The embodiments generally relate to the optical communication, and particularly, to an optical coherent receiver.

BACKGROUND

As the requirements of the capacity and flexibility of the optical communication system are gradually improved, the coherent optical communication technique becomes more and more important. During the coherent optical communication, the transmitted signal is simultaneously modulated in two polarization states of the light usually by means of polarization multiplexing, so as to double the transmission rate under the same bandwidth. At the receiving end, the optical coherent receiver receives signals in two polarization states simultaneously, converts them into base-band digital signals, separates the signals in two polarization states using the demultiplexing technique in the digital domain, and performs a subsequent processing of the signal in each polarization state. From the above content, it can be seen that the performance of the optical coherent receiver is greatly influenced by the fact whether the signals in two polarization states are well separated. Currently, the adaptive filter is usually used for the polarization demultiplexing (refer to Seb J. Savory, etc. "Digital filters for coherent optical receivers", Optics Express, Vol. 16, Issue 2, pp. 804-817).

FIG. 1 illustrates a known optical coherent receiver using a digital polarization demultiplexing device. In FIG. 1, a local oscillation laser 103, polarization beam splitters 102, 104, an optical 90° mixer 109, optical-electrical converters (O/E) 110 to 113 and analog-digital converters (ADC) 114 to 117 constitute the front end of the optical coherent receiver. In FIG. 1, the reference signs 105 to 108 represent the beam-split signals. The function of the front end is to convert the received polarization multiplexed optical signal 101 into base-band electric signals 118 and 119. Due to the influence of factors such as polarization state rotation and nonlinear effect in the channel, each of the base-band electric signals 118 and 119 is a mixture of electric signals modulated in two polarization states. Thus an equalization and polarization demultiplexer 120 is required to equalize and demultiplex the base-band electric signals 118 and 119, so as to separate the signals in two polarization states to obtain signals having no crosstalk to each other, i.e., an H polarization state signal 125 and a V polarization state signal 126 as illustrated in the drawing. Next, phase restorations and data restorations of the signals are performed by an H polarization state phase restorer 121, an H polarization state data restorer 123, a V polarization state phase restorer 122 and a V polarization state data restorer 124, respectively. Generally the equalization and polarization demultiplexer 120 is implemented by an adaptive filter, whose coefficient adjustment may adopt constant modular algorithm, minimum mean square error algorithm (refer to S. J. Savory, etc., "Transmission of 42.8 Gbit/s Polarization Multiplexed NRZ-QPSK over 6400 km of Standard Fiber with no Optical Dispersion Compensation", paper OTuA1, Proceedings of OFC 2007), etc. These algorithms use a feedback structure to adjust the coefficient of the filter according to the channel state change, so that there is no crosstalk between the H polarization state signal 125 and the V polarization state signal 126.

Existing studies show that when the polarization state change in the channel is at the KHz magnitude, the adaptive filter can track the polarization state change at this magnitude. However, due to various reasons (e.g., the nonlinear effect of the channel), the polarization state change in the channel may reach the magnitude of the signal transmission rate, i.e., the GHz magnitude. The current adaptive filter cannot track the polarization state change of such a high speed, thus crosstalk will occur between the output H polarization state signal 125 and V polarization state signal 126 due to the existence of the residual polarization scattering (refer to G. Charlet, etc., "Performance comparison of singly-polarized and polarization multiplexed at 10 Gbaud under nonlinear impairments", OThu8, proceeding of OFC 2008). Assuming that in two polarization states, the transmitted signals are Sh and Sv, the received signals are Rh and Rv, and other signal losses have been ideally compensated. Thus, in case there is no polarization scattering between the two polarization states, $R_h=S_h+n_h$ and $R_v=S_v+n_v$ ($n_h$ and $n_v$ are noises in the H and V polarization states, respectively). In case there is any polarization scattering between the two polarization states, $R_h=W_{hh}S_h+W_{hv}S_v+n_h$ and $R_v=W_{vv}S_v+W_{vh}S_v+n_v$ ($W_{hh}$, $W_{vv}$, $W_{hv}$ and $W_{vh}$ are polarization scattering coefficients, which are all complex numbers with their amplitudes smaller than 1). By comparing the above two cases, it can be seen that the due to the polarization scattering, one polarization state signal may have a crosstalk to another polarization state signal, and since the signals modulated in two polarization states are independent from each other, the crosstalk between the two polarization state signals will certainly decrease the Signal-to-Noise Ratio (SNR) of the received signal, thereby affecting the performance of the receiver.

Thus, new method and device are required to deal with the quick polarization scattering, so as to eliminate or reduce the influence on the performance of the optical coherent receiver caused by the signal crosstalk.

SUMMARY

The embodiments are proposed with respect to the related art, so as to solve one or more problems occurring due to the limitation of the related art, and provide at least one beneficial selection.

In order to achieve the aspect of the embodiments, the embodiments provide the following aspects.

Aspect 1: A polarization scattering compensation device used for a receiver receiving data modulated on signal in first polarization state and signal in second polarization state and transmitted by a transmitter, the polarization scattering compensation device including:

a time sequence alignment unit for aligning time sequences of the signal in the first polarization state and the signal in the second polarization state which is transmitted by the transmitter simultaneously when the signal in the first polarization state is transmitted;

a polarization scattering estimation unit for estimating a scattering coefficient of a scattering by the signal in the first polarization state on the signal in the second polarization state, and a scattering coefficient of a scattering by the signal in the second polarization state on the signal in the first polarization state, with respect to the signals in the first polarization state and the second polarization state after the time sequence alignment; and a polarization scattering removal unit for removing the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state estimated by the polarization scattering estimation unit.

Aspect 2: A coherent receiver, including an H polarization state phase restorer, a V polarization state phase restorer, an H polarization state data restorer, and a V polarization state data restorer, wherein the coherent receiver includes the polarization scattering compensation device according to Aspect 1 which receives signals from the H polarization state phase restorer and the V polarization state phase restorer, and outputs signals to the H polarization state data restorer and the V polarization state data restorer.

Aspect 3: A polarization scattering compensation method used for a receiver receiving data modulated on signal in first polarization state and signal in second polarization state and transmitted by a transmitter, the polarization scattering compensation method comprising:

a time sequence alignment process for aligning time sequences of the signal in the first polarization state and the signal in the second polarization state which is transmitted by the transmitter simultaneously when the signal in the first polarization state is transmitted;

a polarization scattering estimation process for estimating a scattering coefficient of a scattering by the signal in the first polarization state on the signal in the second polarization state, and a scattering coefficient of a scattering by the signal in the second polarization state on the signal in the first polarization state, with respect to the signals in the first and second polarization states after the time sequence alignment; and a polarization scattering removal process for removing the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state estimated by the polarization scattering estimation process.

The method and device according to the embodiments can track and restore the fast polarization change caused by various factors of the transmission link, so as to eliminate the crosstalk between the signals in two polarization states.

These and further aspects and features of the embodiments will be clearer with reference to the following descriptions and drawings. In the descriptions and drawings, specific embodiments are disclosed in details to indicate the ways in which the principle may be employed. But it shall be appreciated that the present invention is not correspondingly limited in the scope. The embodiments include many changes, modifications and equivalents within the spirit and clauses of the accompanied claims.

Features that are described and/or illustrated with respect to one embodiment may be used in the same or similar way in one or more other embodiments to combine or replace the features of other embodiments.

DETAILED DESCRIPTION OF THE EMBODIMENTS

The exemplary embodiments will be described as follows with reference to the drawings. In order to be clear and concise, not all the features of the practical embodiments are described in the specification. However, it shall be appreciated that during the process of developing any of the practical embodiments, many specific decisions of the embodiment must be made to realize the developer's concrete object. For example, the constraint conditions relevant to the system and service are satisfied, and these constraint conditions may vary with the embodiments. In addition, it shall be noted that although the development may be very complex and time consuming, the development is just a routine task for a person skilled in the art who benefits from the disclosure.

To be noted, in order to avoid the discussion from being vague due to unnecessary details, the drawings only illustrate the device structures and/or processing steps closely related to the solution according to the embodiments, while omitting other details not so closely related.

The basic work principle of embodiments is to estimate a polarization scattering coefficient according to the crosstalk between the demultiplexed signals, and perform a polarization restoration of the signal according to the estimated polarization scattering coefficient, so as to eliminate the crosstalk between the two polarization states.

The embodiments are detailedly described as follows with reference to the drawings.

Figure 1:
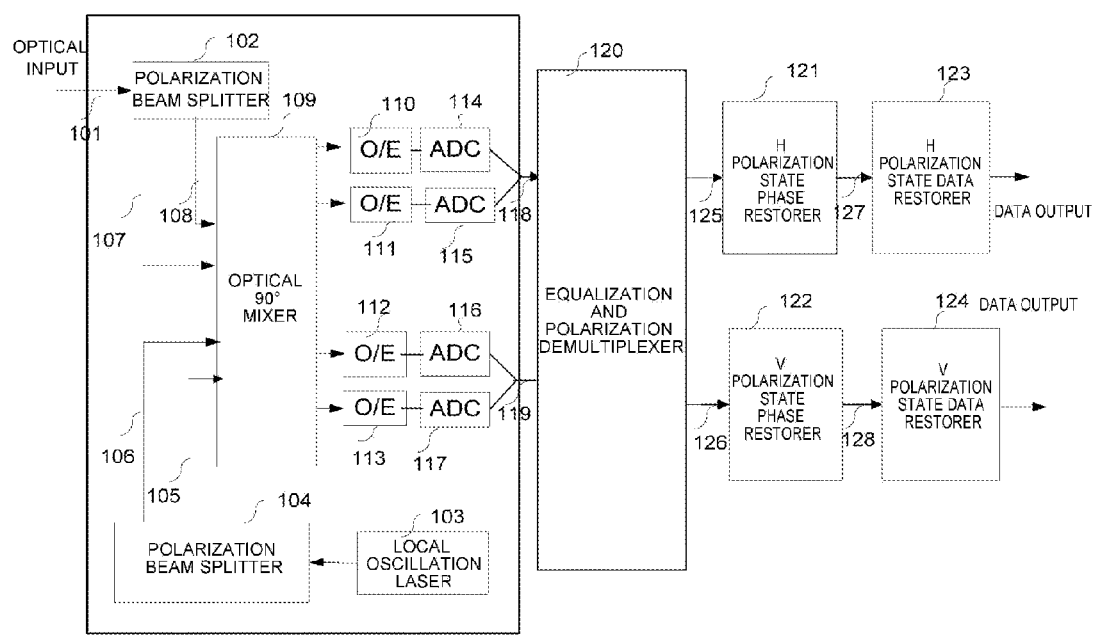
FIG. 1 schematically illustrates a known optical coherent receiver using digital polarization demultiplexing.
Figure 2:
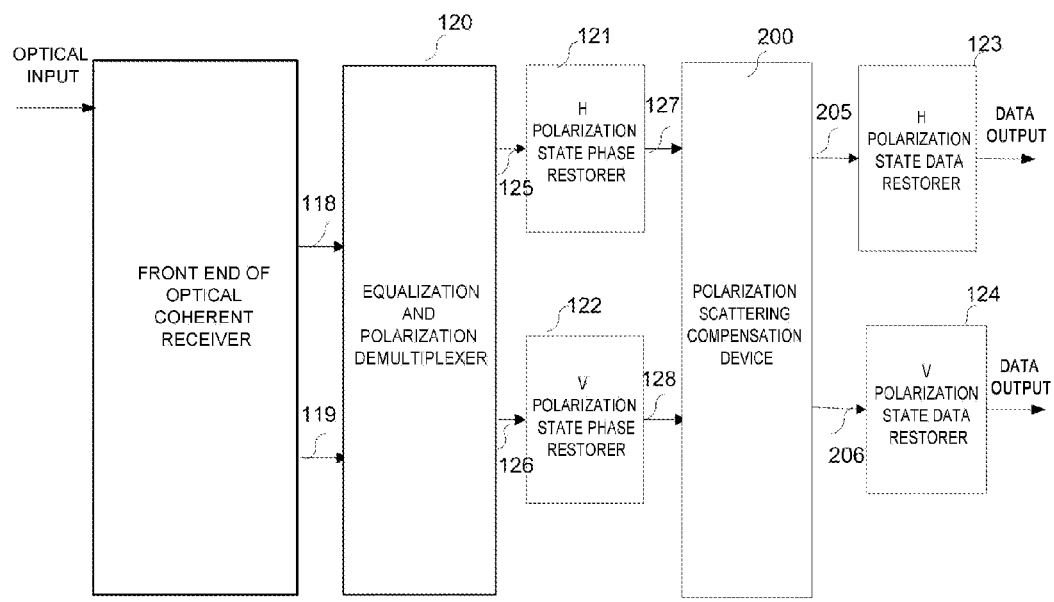
FIG. 2 schematically illustrates an optical coherent receiver according to an embodiment.

FIG. 2 schematically illustrates an optical coherent receiver according to an embodiment. As compared with the related art optical coherent receiver illustrated in FIG. 1, the optical coherent receiver according to an embodiment illustrated in FIG. 2 is only added with a polarization scattering compensation device 200 according to embodiments, and other parts are not changed. The polarization scattering compensation device 200 receives signals 127 and 128 having undergone polarization demultiplexing and phase restoration, performs a polarization scattering restoration thereof, and outputs signals 205 and 206 after the polarization scattering restoration to the data restoring devices (an H polarization state data restorer 123 and a V polarization state data restorer 124).

Figure 3:
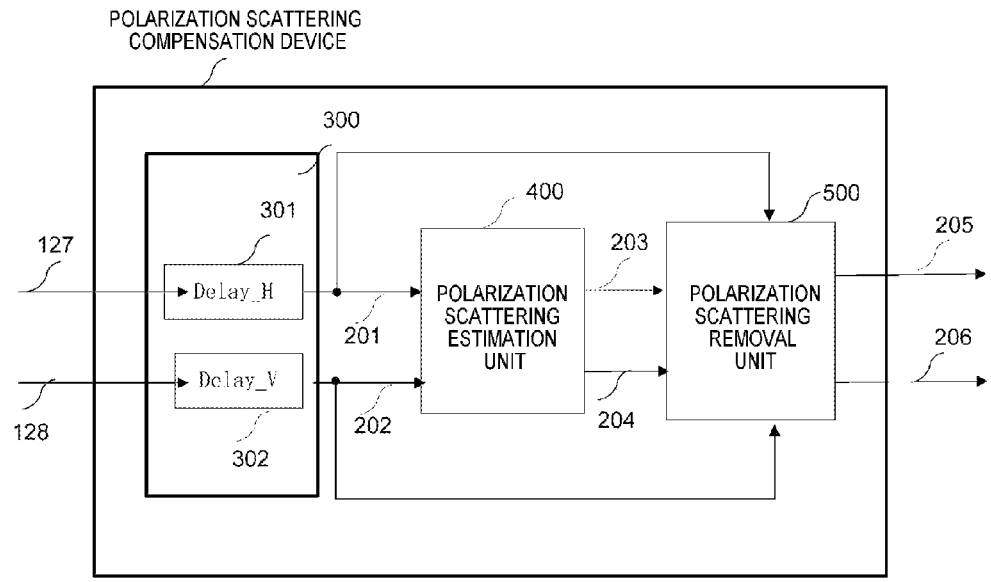
FIG. 3 schematically illustrates a polarization scattering compensation device according to an embodiment.

FIG. 3 schematically illustrates a polarization scattering compensation device 200 according to an embodiment. As illustrated in FIG. 3, the polarization scattering compensation device 200 according to an embodiment includes a time sequence alignment unit 300, a polarization scattering estimation unit 400 and a polarization scattering removal unit 500.

In one embodiment, the time sequence alignment unit 300 includes delay registers 301 and 302. The inputs of the polarization scattering compensation device 200 are phase-restored signals 127 and 128 in two polarization states. The signals 127 and 128 are delayed by the delay registers 301 and 302 for Delay_H and Delay_V symbols, respectively. The purpose of the delay processing is to keep the relative time sequence relationship between the two channels of signals (the H polarization state signal and the V polarization state signal) being consistent with the time sequence relationship at the transmitting end. That is, the time sequences of the H polarization state signal and the V polarization state signal simultaneously transmitted by the transmitter shall be kept unchanged after the time sequence alignment. The values of Delay_H and Delay_V can be obtained from the upper layer processing module (e.g., a frame processing module) of the receiver. The outputs 201 and 202 of the delay registers 301 and 302 enter a polarization scattering estimation unit 400 (which will be described in details later with reference to FIG. 4). The polarization scattering estimation unit 400 estimates the polarization scattering coefficients of the two channels of signals and outputs them as signals 203 and 204. In which, the signal 203 is the polarization scattering coefficient of the V polarization state signal over the H polarization state signal, and the signal 204 is the polarization scattering coefficient of the H polarization state signal over the V polarization state signal. A polarization scattering removal unit 500 (which will be described in details later with reference to FIG. 5) performs a polarization scattering restoration by processing the received signals 203 and 204, and outputs signals 205 and 206 after the polarization scattering restoration. The H polarization state data restorer 123 and the V polarization state data restorer 124 restore data according to the signals 205 and 206, respectively. To be noted, although the time sequences of the signals in two polarization states are aligned using two delay registers in the above description, a person skilled in the art shall be appreciated that the time sequences of the signals in two polarization states can be aligned just using one delay register.

Figure 4:
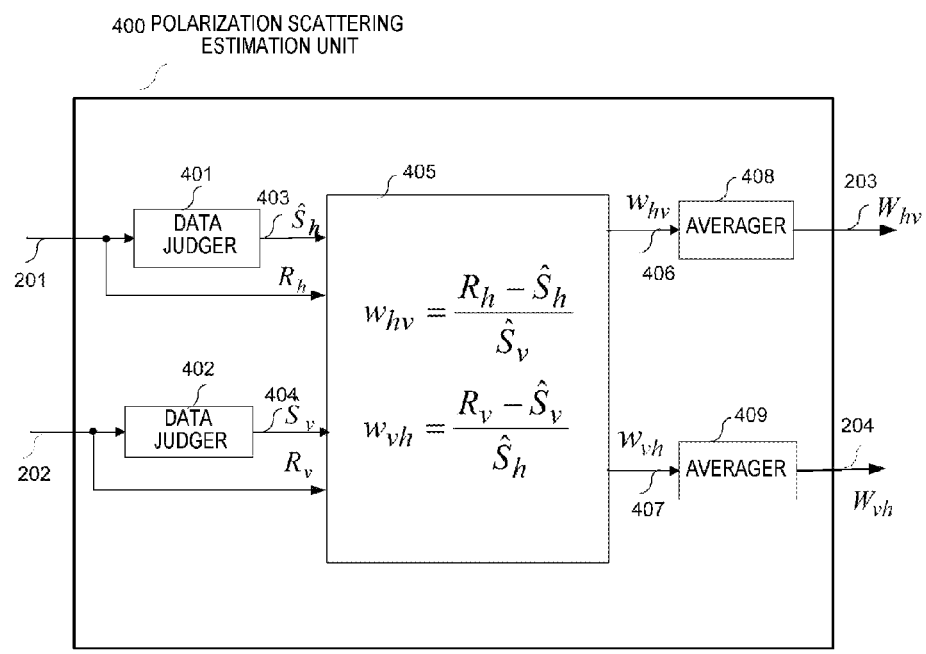
FIG. 4 schematically illustrates a polarization scattering estimation unit according to an embodiment.

FIG. 4 schematically illustrates a polarization scattering estimation unit 400 according to an embodiment. As illustrated in FIG. 4, the inputs of the polarization scattering estimation unit 400 are signals 201 and 202 with their time sequences aligned, i.e., an H polarization state signal $R_h$ and a V polarization state signal $R_v$. In accordance with the signals 201 and 202, data judgers 401 and 402 respectively estimate data 403 and 404 (judged data, i.e., $\hat{S}_h$ and $\hat{S}_v$) modulated on the signals in two polarization states. The data judgers 401 and 402 may perform a data judgment with any method known to a person skilled in the art at present or in future, such as soft judgment, hard judgment, etc.

The judged data 403 and 404 and the signals 201 and 202 are together input to a polarization scattering coefficient estimation unit 405, which calculates the polarization scattering coefficients at respective symbol moments, i.e., the scattering coefficient $w_{hv}$ of the V polarization state signal over the H polarization state signal, and the scattering coefficient $w_{vh}$ of the H polarization state signal over the V polarization state signal, according to the signals in two polarization states and the judged data. In one embodiment, these scattering coefficients may be estimated in the following equations:

$$w_{hv} = \frac{R_h - \hat{S}_h}{\hat{S}_v}$$

$$w_{vh} = \frac{R_v - \hat{S}_v}{\hat{S}_h}$$

$w_{hv}$ and $w_{vh}$ calculated at respective symbol moments are output as signals 406 and 407, respectively. Next, they are averaged by averagers 408 and 409, respectively, to eliminate the noise influence. The number of $w_{hv}$ and $w_{vh}$ to be averaged can be determined upon demand. The output signals 203 and 204 of the averagers 408 and 409 are the estimated polarization scattering coefficients.

Figure 5A:
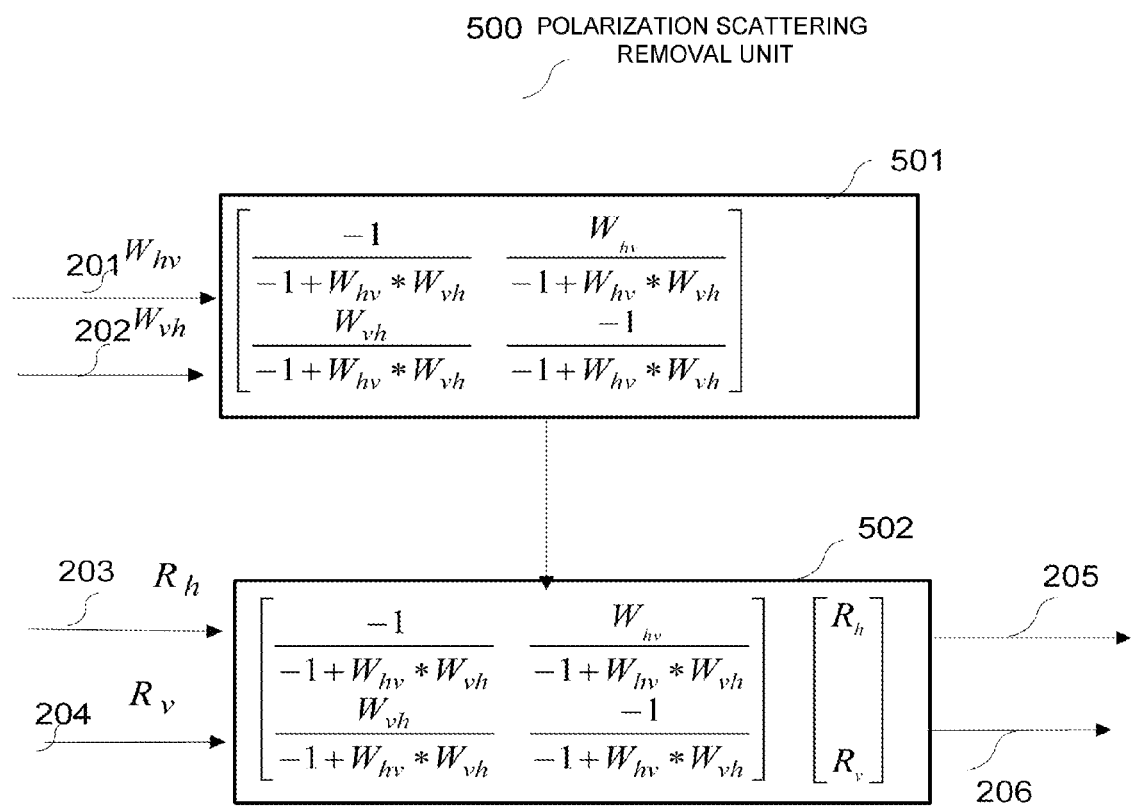
FIG. 5A schematically illustrates a polarization scattering removal unit according to an embodiment.

FIG. 5A schematically illustrates a polarization scattering removal unit according to an embodiment. It is assumed that the modulation signals in two polarization states are $S_h$ and $S_v$ (for example, with respect to QPSK, $S_h=e^{j\Phi_{d,H}}$ and $S_v=e^{j\Phi_{d,V}}$, in which either of $\phi_{d,H}$ and $\phi_{d,V}$ is a value of π4, 3π/4, 5π/4 or 7π/4). Generally, $R_h$ and $R_v$ may be represented as follows with $S_h$ and $S_v$:

$$\begin{bmatrix} R_h \\ R_v \end{bmatrix} = \begin{bmatrix} W_{hh} & W_{hv} \\ W_{vh} & W_{vv} \end{bmatrix} \begin{bmatrix} S_h \\ S_v \end{bmatrix}$$

Since $R_h$ and $R_v$ are signals obtained through a polarization demultiplexing performed by the adaptive filter, it may be assumed that $|W_{vh}|$ and $|W_{hv}|$ are both far less than 1, while $W_{hh}$ 和 $W_{vv}$ are approximately equal to 1. Thus the relationship between $(R_h, R_v)$ and $(S_h, S_v)$ may be simplified as follows:

$$\begin{bmatrix} R_h \\ R_v \end{bmatrix} = \begin{bmatrix} 1 & W_{hv} \\ W_{vh} & 1 \end{bmatrix} \begin{bmatrix} S_h \\ S_v \end{bmatrix}$$

In accordance with the above relationship, a polarization scattering matrix will be determined once the polarization scattering coefficients $W_{hv}$ and $W_{vh}$ are determined by the polarization scattering estimation unit according to the embodiment of the present invention. The polarization scattering removal unit can realize a polarization restoration just by performing an inverse operation on the polarization scattering matrix with respect to the received signal, as shown in the following equation:

$$\begin{bmatrix} S_h \\ S_v \end{bmatrix} = \begin{bmatrix} 1 & W_{hv} \\ W_{vh} & 1 \end{bmatrix}^{-1} \begin{bmatrix} R_h \\ R_v \end{bmatrix} =$$

$$\begin{bmatrix} -1/(-1+W_{hv}*W_{vh}) & W_{hv}/(-1+W_{hv}*W_{vh}) \\ W_{vh}/(-1+W_{hv}*W_{vh}) & -1/(-1+W_{hv}*W_{vh}) \end{bmatrix} \begin{bmatrix} R_h \\ R_v \end{bmatrix}$$

The polarization scattering removal unit according to an embodiment as illustrated in FIG. 5 removes the polarization scattering by directly multiplying the inverse matrix of the polarization scattering matrix with the received $R_h$ and $R_v$.

Specifically, as illustrated in FIG. 5A, the polarization scattering removal unit 500 includes an inverse matrix calculation unit 501 configured to calculate an inverse matrix of a polarization scattering matrix between the signals in two polarization states according to the polarization scattering coefficients $W_{hv}$ and $W_{vh}$, and a multiplication unit 502 configured to multiply signals $R_h$ and $R_v$ with the calculated inverse matrix of the polarization scattering matrix between the signals in two polarization states.

The polarization scattering removal unit in FIG. 5A obtains polarization-restored signals in two polarization states by multiplying the received signals with the inverse matrix of the polarization scattering matrix, and outputs them as the polarization-scattering-restored signals 205 and 206.

Figure 5B:
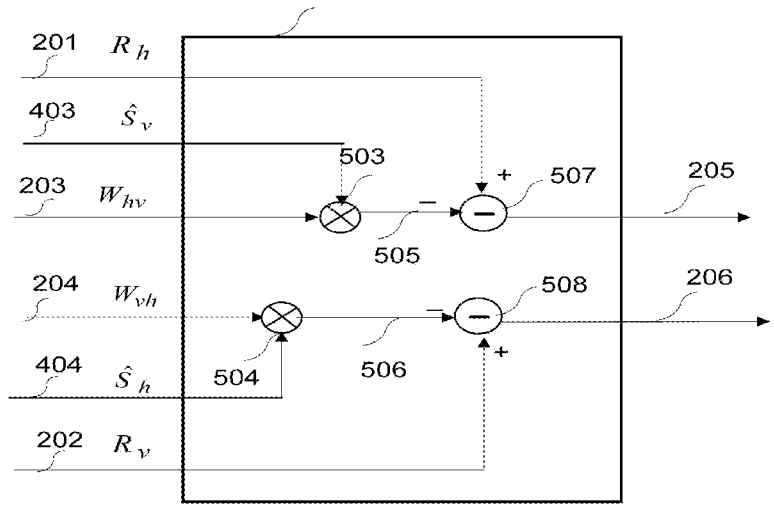
FIG. 5B schematically illustrates a polarization scattering removal unit according to another embodiment.

FIG. 5B schematically illustrates a polarization scattering removal unit according to another embodiment. FIG. 5B illustrates a second implementation of the polarization scattering removal unit. This implementation assumes that the data $\hat{S}_h$ and $\hat{S}_v$ judged by the data judgers in the polarization scattering estimation unit are transmitted data $S_h$ and $S_v$. Thus scattering amounts 505 and 506 between the signals in two polarization states are obtained by multiplying $\hat{S}_v$ with $W_{hv}$ and multiplying $\hat{S}_h$ with $W_{hv}$ through multipliers 503 and 504, respectively. Next, the polarization restoration is realized by subtracting the scattering amounts from the received signals through subtracters 507 and 508.

Figure 5C:
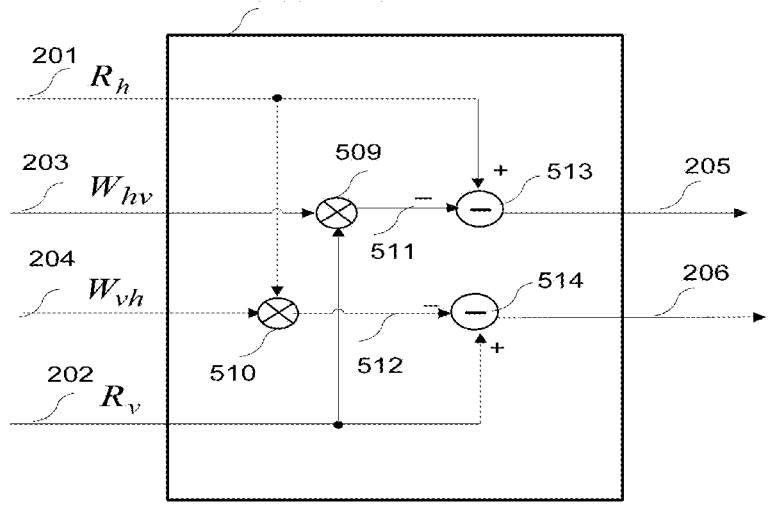
FIG. 5C schematically illustrates a polarization scattering removal unit according to still another embodiment.

FIG. 5C schematically illustrates a polarization scattering removal unit according to still another embodiment. FIG. 5C illustrates a third implementation of the polarization scattering removal unit. This implementation may be regarded as a simplification of the first implementation illustrated in FIG. 5A. As described above, $|W_{vh}|$ and $|W_{hv}|$ are both far less than 1, thus $|W_{hv}*W_{vh}|$ is far less than 1, and a simplified polarization scattering removal method can be obtained as follows by omitting $W_{hv}*W_{vh}$ in the inverse matrix of the polarization scattering matrix:

$$\begin{bmatrix} S_h \\ S_v \end{bmatrix} = \begin{bmatrix} 1 & -W_{hv} \\ -W_{vh} & 1 \end{bmatrix} \begin{bmatrix} R_h \\ R_v \end{bmatrix}$$

The third implementation of the polarization scattering removal unit of embodiment is just a simplified method on this basis. As illustrated in FIG. 5C, scattering amounts 511 and 512 between the signals in two polarization states are obtained by multiplying the received signals $R_v$ and $R_h$ with $W_{hv}$ and $W_{vh}$ through multipliers 409 and 410, respectively. Next, the polarization restoration is realized by subtracting corresponding polarization scattering amounts from the received signals through subtracters 513 and 514.

Figure 6:
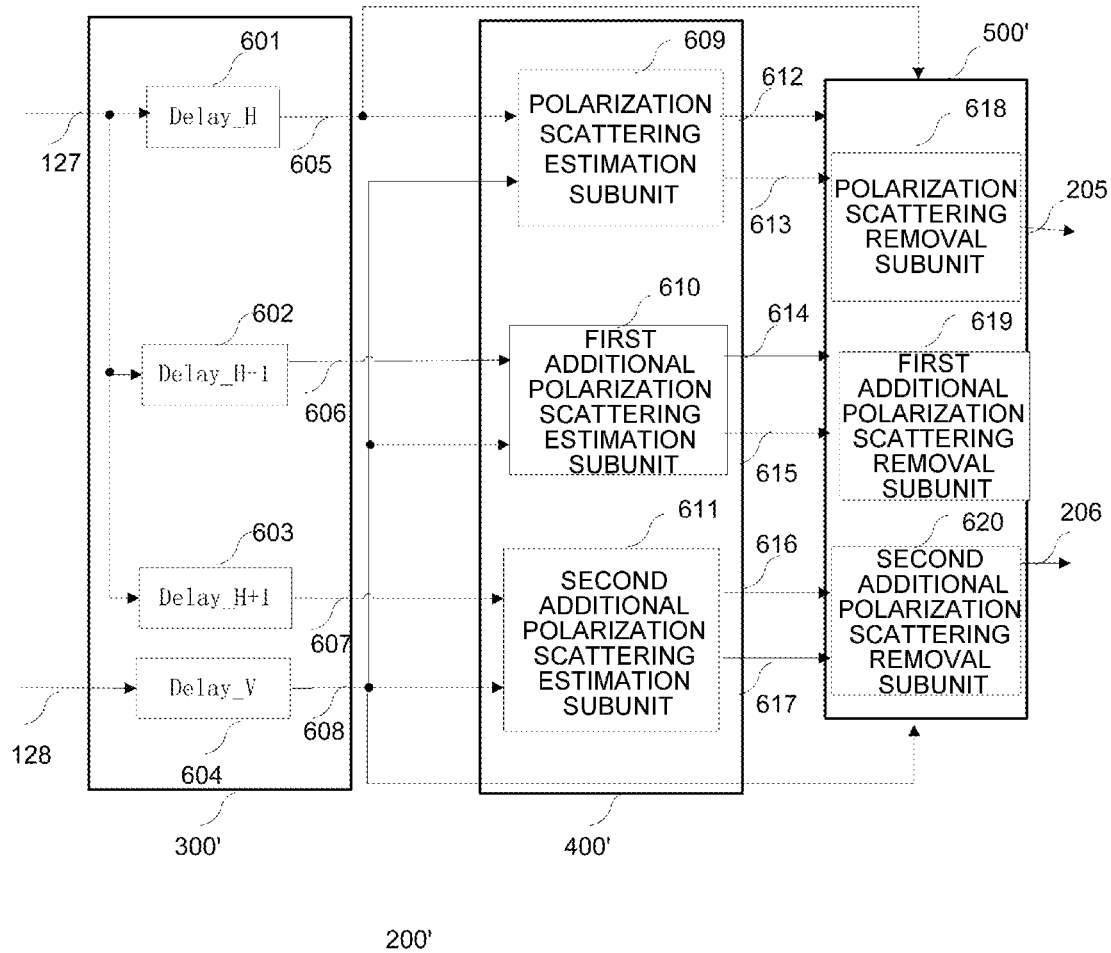
FIG. 6 schematically illustrates a polarization scattering compensation device according to another embodiment.

FIG. 6 schematically illustrates a polarization scattering compensation device 200' according to another embodiment.

Specifically as illustrated in FIG. 6, the polarization scattering compensation device 200' includes a time sequence alignment unit 300', a polarization scattering estimation unit 400' and a polarization scattering removal unit 500'.

The time sequence alignment unit 300' includes a first delay register 601, a second delay register 602, a third delay register 603 and a fourth delay register 604

The first delay register 601 and the fourth delay register 604 are corresponding to a time sequence alignment subunit according to an embodiment configured to align the time sequences of signals $R_h$ and $R_v$ in two polarization states simultaneously transmitted by a transmitting end. The second delay register 602 and the fourth delay register 604 are corresponding to a first additional time sequence alignment unit according to an embodiment configured to align the time sequences of one of the signals $R_h$ and $R_v$ in two polarization states simultaneously transmitted by the transmitting end (e.g., the V polarization state signal $R_v$) and a signal $R'_h$ several symbol periods (for example one symbol as illustrated in FIG. 6) before the other of the signals $R_h$ and $R_v$ in two polarization states (e.g., the H polarization state signal $R_h$). The third delay register 603 and the fourth delay register 604 construct a second additional time sequence alignment unit according to an embodiment configured to align the time sequences of one of the signals $R_h$ and $R_v$ in two polarization states simultaneously transmitted by the transmitting end (e.g., the V polarization state signal $R_v$) and a signal $R''_h$ several symbol periods (for example one symbol) after the other of the signals $R_h$ and $R_v$ in two polarization states (e.g., the H polarization state signal $R_h$).

To be noted, although the time sequences of the signals in two polarization states are aligned using four delay registers in the above description, a person skilled in the art shall be appreciated that the time sequences of the signals in two polarization states may be aligned using three, five or six delay registers. In case six delay registers are used, the time sequence alignment unit, the first additional time sequence alignment unit and the second additional time sequence alignment unit may be implemented using two delay registers, respectively.

A polarization scattering estimation subunit 609, a first additional polarization scattering estimation subunit 610 and a second additional polarization scattering estimation subunit 611 may adopt the structure of the polarization scattering estimation unit previously described with reference to FIG. 4.

Thus, the polarization scattering estimation subunit 609 estimates scattering coefficients of the signals in two polarization states simultaneously transmitted by the transmitting end. The first additional polarization scattering estimation subunit 610 and the second additional polarization scattering estimation subunit 611 estimate scattering coefficients between the signal in one polarization state and a signal one symbol period before the signal in the other polarization state, and scattering coefficients between the signal in one polarization state and a signal one symbol period after the signal in the other polarization state, respectively. As illustrated in FIG. 6, outputs 612 and 613 of the polarization scattering estimation subunit 609 are polarization scattering coefficients $W_{hv}(t)$ and $W_{vh}(t)$ between the H and V polarization state signals transmitted simultaneously. Outputs 614 and 615 of the first additional polarization scattering estimation subunit 610 are polarization scattering coefficients $W_{hv}(t-T)$ and $W_{vh}(t-T)$ and between the V polarization state signal and an H polarization state signal transmitted one symbol period before. Outputs 616 and 617 of the second additional polarization scattering estimation subunit 611 are polarization scattering coefficients $W_{hv}(t+T)$ and $W_{vh}(t+T)$ between the V polarization state signal and an H polarization state signal transmitted one symbol period later. The outputs of the three polarization scattering estimation means and the received signals $R_h$ and $R_v$ with their time sequences aligned are all input to a polarization scattering removal unit 500'.

The polarization scattering removal unit 500' includes a polarization scattering removal subunit 618, a first additional polarization scattering removal subunit 619 and a second additional polarization scattering removal subunit 620. The polarization scattering removal subunit 618 is configured to remove the scatterings between the signals in two polarization states simultaneously transmitted by the transmitting end, according to the scattering coefficients obtained by the polarization scattering estimation subunit 609. The first additional polarization scattering removal subunit 619 is configured to remove the scatterings between the signal in one polarization state and a signal in the other polarization state one or more symbols periods before, according to the scattering coefficients obtained by the first additional polarization scattering estimation subunit 610. The second additional polarization scattering removal subunit 620 is configured to remove the scatterings between the signal in one polarization state and a signal in the other polarization state one or more symbols periods later, according to the scattering coefficients obtained by the second additional polarization scattering estimation subunit 611.

In the polarization scattering removal unit 500', firstly the scatterings between the adjacent symbols from the signal in the other polarization state at the current moment may be calculated, and then the polarization restoration is realized by subtracting the scattering of the V polarization state signal from the H polarization state signal $R_h$, and subtracting the scattering of the H polarization state signal from the V polarization state signal $R_v$, respectively. For example, when the method corresponding to FIG. 5C is adopted, at the moment t, the scattering from the V polarization state signal is $W_{hv}(t)R_v(t)+W_{hv}(t+T)R_v(t-T)R_v(t+T)$ with respect to the H polarization state signal, and the scattering from the H polarization state signal is $W_{vh}(t)R_h(t)+W_{vh}(t+T)R_h(t+T)+W_{vh}(t-T)R_h(t-T)$ with respect to the V polarization state signal.

Thus at that time, the first additional polarization scattering removal subunit 619 may calculate and remove the third items in the above equations, respectively, i.e., remove the scattering by the signal in the first polarization state on the signal in the second polarization state transmitted at the moment one or more symbols before the signal in the first polarization state is transmitted by the transmitter, and remove the scattering by the signal in the second polarization state transmitted at the moment one or more symbols before the signal in the first polarization state is transmitted by the transmitter on the signal in the first polarization state. The second additional polarization scattering removal subunit 620 may calculate and remove the second items in the above equations, respectively, i.e., remove the scattering by the signal in the first polarization state on the signal in the second polarization state transmitted at the moment one or more symbols after the signal in the first polarization state is transmitted by the transmitter, and remove the scattering by the signal in the second polarization state transmitted at the moment one or more symbols after the signal in the first polarization state is transmitted by the transmitter on the signal in the first polarization state. The second polarization scattering removal subunit 620 may calculate and remove the first items in the above equations, respectively.

To be noted, the embodiments are not limited hereby although in the embodiment as illustrated in FIG. 6, the scattering coefficients $W_{hv}(t-T)$ and $W_{vh}(t-T)$ between the V polarization state signal and the H polarization state signal transmitted one symbol period before, and the scattering coefficients $W_{hv}(t+T)$ and $W_{vh}(t+T)$ between the V polarization state signal and the H polarization state signal transmitted one symbol period later, are additionally calculated besides the scattering coefficients $W_{hv}(t)$ and $W_{vh}(t)$ between the H and V polarization state signals simultaneously transmitted by the transmitter. In an alternative embodiment, scattering coefficients $W_{hv}(t-T)$ and $W_{vh}(t-T)$ between the V polarization state signal and the H polarization state signal transmitted one symbol period before may be just calculated. In that case, the calculated scattering by the V polarization state signal on the H polarization state signal is $W_{hv}(t)R_v(t)+W_{hv}(t-T)R_v(t+T)$, while the scattering by the H polarization state signal on the V polarization state signal is $W_{vh}(t)R_h(t)+W_{vh}(t-T)R_h(t-T)$. In addition, only the scattering coefficients $W_{hv}(t+T)$ and $W_{vh}(t+T)$ between the V polarization state signal and the H polarization state signal transmitted one symbol period later may be additionally calculated. At that time, the calculated scattering by the V polarization state signal on the H polarization state signal is $W_{hv}(t)R_v(t)+W_{hv}(t+T)R_v(t-T)$, while the scattering by the H polarization state signal on the V polarization state signal is $W_{vh}(t)R_h(t)+W_{vh}(t+T)R_h(t+T)$.

Figure 7:
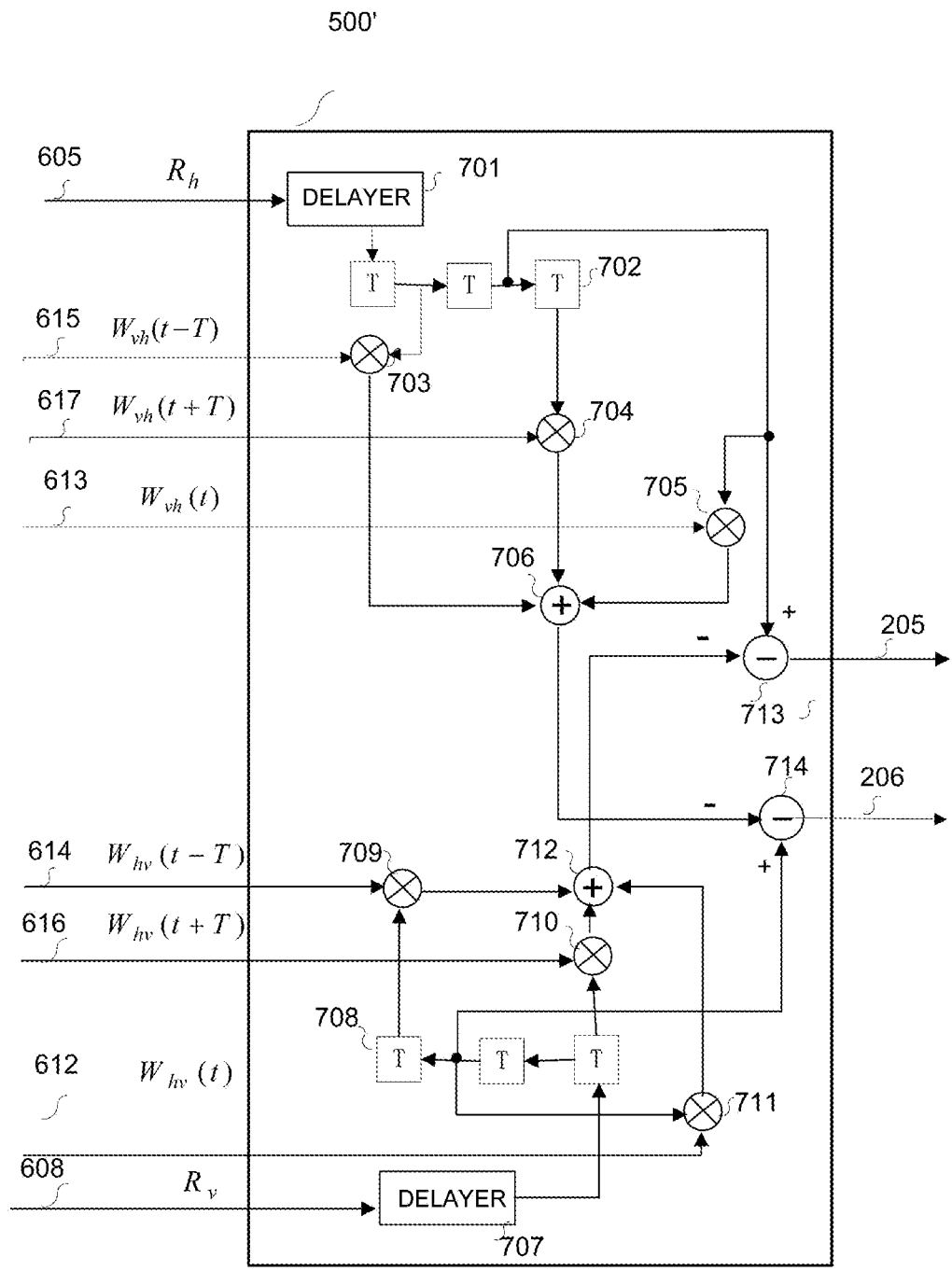
FIG. 7 schematically illustrates a polarization scattering removal unit according to yet another embodiment.

FIG. 7 schematically illustrates a polarization scattering removal unit 500' according to an embodiment. As illustrated in FIG. 7, signal sequences $R_h(t)$ and $R_v(t)$ (also marked as $R_h$ and $R_v$) are input to the polarization scattering removal unit 500', respectively. Meanwhile, the outputs of polarization scattering estimation subunits 609~611 are also input to the polarization scattering removal unit 500'. The polarization scattering removal unit 500' includes an $R_h$ input delayer 701 and a three-order delay register 702. The delayer 701 delays $R_h$ for (D−2) symbol periods, wherein the D symbol periods are calculation time required for the front end polarization scattering estimation, thus the three outputs of the three-order delay register 702 are $R_h(t-T)$, $R_h(t)$ and $R_h(t+T)$ synchronous with the estimated polarization scattering coefficients, respectively. $R_h(t+T)$ is multiplied with the input polarization scattering coefficient $W_{vh}(t+T)$ at a multiplier 704 to obtain the scattering on the V polarization state signal from the H polarization state signal at a next moment. $R_h(t-T)$ is multiplied with the input polarization scattering coefficient $W_{vh}(t-T)$ at a multiplier 703 to obtain the scattering on the V polarization state signal from the H polarization state signal at a previous moment. $R_h(t)$ is multiplied with the input polarization scattering coefficient $W_{vh}(t)$ at a multiplier 705 to obtain the scattering on the V polarization state signal from the H polarization state signal transmitted simultaneously. The three scatterings are added at an adder 706 to obtain the scatterings on the V polarization state signal from three adjacent symbols of the H polarization state signal. The polarization restoration of the V polarization state signal is realized by subtracting the scattering from $R_v(t)$ through a subtractor 714.

Similarly, $R_v$ is processed by a delayer 707 and a three-order delay register 708 to obtain $R_v(t-T)$, $R_v(t)$ and $R_v(t+T)$. $R_v(t+T)$ is multiplied with the input polarization scattering coefficient $W_{hv}(t-T)$ at a multiplier 709 to obtain the scattering on the H polarization state signal from the V polarization state signal at a next symbol moment. $R_v(t-T)$ is multiplied with the input polarization scattering coefficient $W_{hv}(t+T)$ at a multiplier 710 to obtain the scattering on the H polarization state signal from the V polarization state signal at a previous moment. $R_v(t)$ is multiplied with the input polarization scattering coefficient $W_{hv}(t)$ at a multiplier 711 to obtain the scattering on the H polarization state signal from the V polarization state signal transmitted simultaneously. The three scatterings are added at an adder 712 to obtain the scattering on the H polarization state signal from three adjacent symbols of the V polarization state signal. The polarization restoration of the H polarization state signal is realized by subtracting the scattering from $R_h(t)$ through a subtractor 713.

Obviously, the adder 706 and the subtractor 714 in FIG. 7 may be replaced by three subtractors, and regarded as an integration of the three subtractors. The adder 712 and the subtractor 713 may also be replaced by three subtractors, and regarded as an integration of the three subtractors.

In FIG. 7, the delayers 701, 702, 707, 708, the multiplier 703 and the subtractor 714, and the multiplier 709 and the subtractor 713 are corresponding to the first additional scattering removal unit; while the delayers 701, 702, 707, 708, the multiplier 704 and the subtractor 714, and the multiplier 710 and the subtractor 713 are corresponding to the second additional scattering removal unit.

In addition, according to another embodiment, $\hat{S}_v$ and $\hat{S}_h$ may be shifted forwardly or backwardly in the sequence and then multiplied with corresponding polarization scattering coefficients, rather than shifting $R_v$ and $R_h$ forwardly or backwardly in the sequence. This technical solution can be well understood by referring to FIGS. 5B and 7, and herein is omitted.

FIG. 7 only illustrates one embodiment of the polarization scattering removal unit 500' in FIG. 6, and based on the description, a person skilled in the art can conceive of other embodiments which fall within the scope of the embodiments.

Similarly, although FIGS. 6-7 are added with the first and second additional polarization scattering removal subunits as compared with FIG. 5C, a person skilled in the art shall be appreciated that only one of the first and second additional polarization scattering removal subunits may be added.

The polarization scattering compensation device 200' in FIG. 6 compensates the polarization scattering by estimating and removing polarization scatterings on the signal in one polarization state from multiple symbols of the signal in the other polarization state, thereby achieving a polarization restoration more ideal than that achieved by the polarization scattering compensation device 200 in FIG. 3.

In addition, FIG. 6 takes the three-order as an example (i.e., aligning the time sequence of the signal in one polarization state and those of signals in the other polarization state at the previous symbol moment, simultaneously, and at the next symbol moment, respectively; calculating corresponding polarization scattering coefficients; and removing the polarization scatterings), and upon demand on the performance, FIG. 6 can use a higher order (i.e., aligning the time sequence of the signal in one polarization state and those of signals in the other polarization state at more symbol moments; calculating corresponding polarization scattering coefficients; and removing the polarization scatterings) with the cost of more complex hardware and larger process load.

As can be seen from the above description, the polarization restoration device mainly differs from the past polarization restoration based on the adaptive filter in that the past technique adjusts the working parameters of the polarization restoration based on the error between the output after the polarization restoration and the ideal output, while the polarization restoration device according to the embodiment uses a polarization scattering compensation device to directly estimate the polarization scattering coefficients and correct the polarization scatterings based on the coefficients, thereby greatly improving the tracking speed of the polarization restoration.

Figure 8:
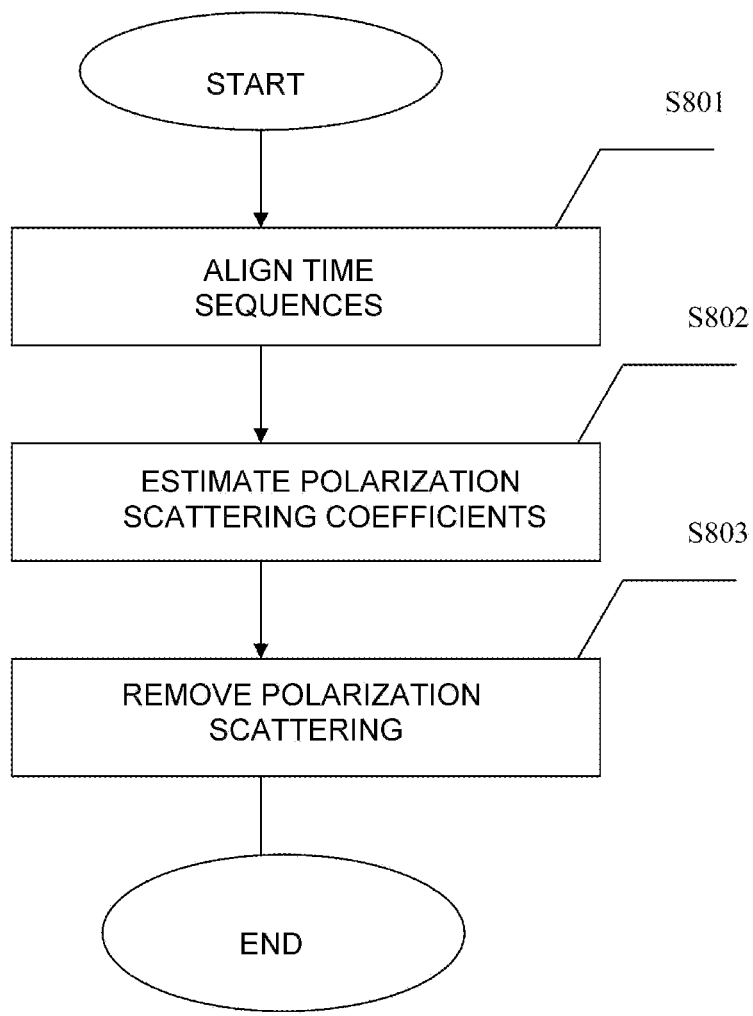
FIG. 8 schematically illustrates a flowchart of a polarization scattering compensation method according to an embodiment.

FIG. 8 schematically illustrates a flowchart of a polarization scattering compensation method according to another embodiment. The polarization scattering compensation method is used for a receiver receiving data modulated on signal in first polarization state and signal in second polarization state and transmitted by a transmitter. As illustrated in FIG. 8, the polarization scattering compensation method according to an embodiment firstly, in step S801, aligns the time sequences of signals in two polarization states; next in step S802, estimates a scattering coefficient of a scattering by the signal in one polarization state on the signal in the other polarization state, and a scattering coefficient of a scattering by the signal in the other polarization state on the signal in the one polarization state; and in step S803, removes the scattering by the signal in the one polarization state on the signal in the other polarization state, and the scattering by the signal in the other polarization state on the signal in the one polarization state based on the scattering coefficients acquired in step S802.

Specifically, in one embodiment, in step S801, the time sequence alignment unit aligns time sequences of the signal in a first polarization state (e.g., H polarization state signal) and the signal in a second polarization state (e.g., V polarization state signal) transmitted simultaneously when the signal in the first polarization state is transmitted by the transmitter. Next in step S802, a polarization scattering estimation unit estimates a scattering coefficient $W_{vh}$ of a scattering by the signal in the first polarization state on the signal in the second polarization state, and a scattering coefficient $W_{hv}$ of a scattering by the signal in the second polarization state on the signal in the first polarization state, with respect to the signals in the first and second polarization states after the time sequence alignment. Finally in step S803, a polarization scattering removal unit removes the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state estimated by the polarization scattering estimation unit.

In another embodiment, in step S801, the time sequence alignment unit not only aligns the time sequences of the signal in the first polarization state (e.g., H polarization state signal) and the signal in the second polarization state (e.g., V polarization state signal) transmitted simultaneously when the signal in the first polarization state is transmitted by the transmitter, but also aligns the time sequences of the signal in the first polarization state (e.g., H polarization state signal) and the signal in the second polarization state (e.g., V polarization state signal) transmitted at a symbol moment one or more symbols after the signal in the first polarization state is transmitted by the transmitter. Next in step S802, the polarization scattering estimation unit estimates a scattering coefficient $W_{vh}(t)$ of a scattering by the signal in the first polarization state on the signal in the second polarization state, and a scattering coefficient $W_{hv}(t)$ of a scattering by the signal in the second polarization state on the signal in the first polarization state, with respect to the signals in the first and second polarization states after the time sequence alignment. In addition, the polarization scattering estimation unit also estimates a scattering coefficient $W_{vh}(t+T)$ of a scattering by the signal in the first polarization state on the signal in the second polarization state transmitted at the symbol moment one or more symbols after the signal in the first polarization state is transmitted by the transmitter, and a scattering coefficient $W_{hv}(t+T)$ of a scattering by the signal in the second polarization state transmitted at the symbol moment one or more symbols after the signal in the first polarization state is transmitted by the transmitter on the signal in the first polarization state, with to respect to the signal in the first polarization state and the signal in the second polarization state transmitted at the symbol moment one or more symbols after the signal in the first polarization state is transmitted by the transmitter after the time sequence alignment. Finally in step S803, the polarization scattering removal unit removes the scattering by the signal in the first polarization state on the signal in the second polarization state transmitted simultaneously when the signal in the first polarization state is transmitted, the scattering by the signal in the second polarization state transmitted simultaneously when the signal in the first polarization state is transmitted on the signal in the first polarization state, the scattering by the signal in the first polarization state on the signal in the second polarization state transmitted at the symbol moment one or more symbols after the signal in the first polarization state is transmitted, and the scattering by the signal in the second polarization state transmitted at the symbol moment one or more symbols after the signal in the first polarization state is transmitted on the signal in the first polarization state, in accordance with the scattering coefficient of the scattering by the signal in the first polarization state on the signal in the second polarization state, the scattering coefficient of the scattering by the signal in the second polarization state on the signal in the first polarization state, $W_{vh}(t+T)$ and $W_{hv}(t+T)$ estimated by the polarization scattering estimation unit.

In still another embodiment, in step S801, the time sequence alignment unit not only aligns the time sequences of the signal in the first polarization state (e.g., H polarization state signal) and the signal in the second polarization state (e.g., V polarization state signal) transmitted simultaneously when the signal in the first polarization state is transmitted by the transmitter, but also aligns the time sequences of the signal in the first polarization state and the signal in the second polarization state transmitted at the symbol moment one or more symbols before the signal in the first polarization state is transmitted by the transmitter. Next in step S802, the polarization scattering estimation unit estimates a scattering coefficient $W_{vh}(t)$ of a scattering by the signal in the first polarization state on the signal in the second polarization state, and a scattering coefficient $W_{hv}(t)$ of a scattering by the signal in the second polarization state on the signal in the first polarization state, with respect to the signals in the first and second polarization states after the time to sequence alignment. In addition, the polarization scattering estimation unit also estimates a scattering coefficient $W_{vh}(t-T)$ of a scattering by the signal in the first polarization state on the signal in the second polarization state transmitted at the symbol moment one or more symbols before the signal in the first polarization state is transmitted by the transmitter, and a scattering coefficient $W_{hv}(t-T)$ of a scattering by the signal in the second polarization state transmitted at the symbol moment one or more symbols before the signal in the first polarization state is transmitted by the transmitter on the signal in the first polarization state, with respect to the signal in the first polarization state and the signal in the second polarization state transmitted at the symbol moment one or more symbols before the signal in the first polarization state is transmitted by the transmitter after the time sequence alignment. Finally in step S803, the polarization scattering removal unit removes the scattering by the signal in the first polarization state on the signal in the second polarization state transmitted simultaneously when the signal in the first polarization state is transmitted, the scattering by the signal in the second polarization state transmitted simultaneously when the signal in the first polarization state is transmitted on the signal in the first polarization state, the scattering by the signal in the first polarization state on the signal in the second polarization state transmitted at the symbol moment one or more symbols before the signal in the first polarization state is transmitted, and the scattering by the signal in the second polarization state transmitted at the symbol moment one or more symbols before the signal in the first polarization state is transmitted on the signal in the first polarization state, in accordance with the scattering coefficient of the scattering by the signal in the first polarization state on the signal in the second polarization state, the scattering coefficient of the scattering by the signal in the second polarization state on the signal in the first polarization state, $W_{vh}(t-T)$ and $W_{hv}(t-T)$ estimated by the polarization scattering estimation unit.

In a further embodiment, in step S801, the time sequence alignment unit not only aligns the time sequences of the signal in the first polarization state (e.g., H polarization state signal) and the signal in the second polarization state (e.g., V polarization state signal) transmitted simultaneously when the signal in the first polarization state is transmitted by the transmitter, but also aligns the time to sequences of the signal in the first polarization state and the signal in the second polarization state transmitted at the symbol moment one or more symbols before the signal in the first polarization state is transmitted by the transmitter. In addition, the time sequence alignment unit further aligns the time sequences of the signal in the first polarization state and the signal in the second polarization state transmitted by the transmitter at the symbol moment one or more symbols after the signal in the first polarization state is transmitted by the transmitter. Next in step S802, the polarization scattering estimation unit estimates the scattering coefficients $W_{vh}(t)$, $W_{hv}(t)$, $W_{vh}(t-T)$, $W_{hv}(t-T)$, $W_{vh}(t+T)$ and $W_{hv}(t+T)$. Finally in step S803, the polarization scattering removal unit removes the scattering by the signal in the first polarization state on the signal in the second polarization state, and the scattering by the signal in the second polarization state on the signal in the first polarization state, according to the scattering coefficients $W_{vh}(t)$, $W_{hv}(t)$, $W_{vh}(t-T)$, $W_{hv}(t-T)$, $W_{vh}(t+T)$ and $W_{hv}(t+T)$.

Figure 9:
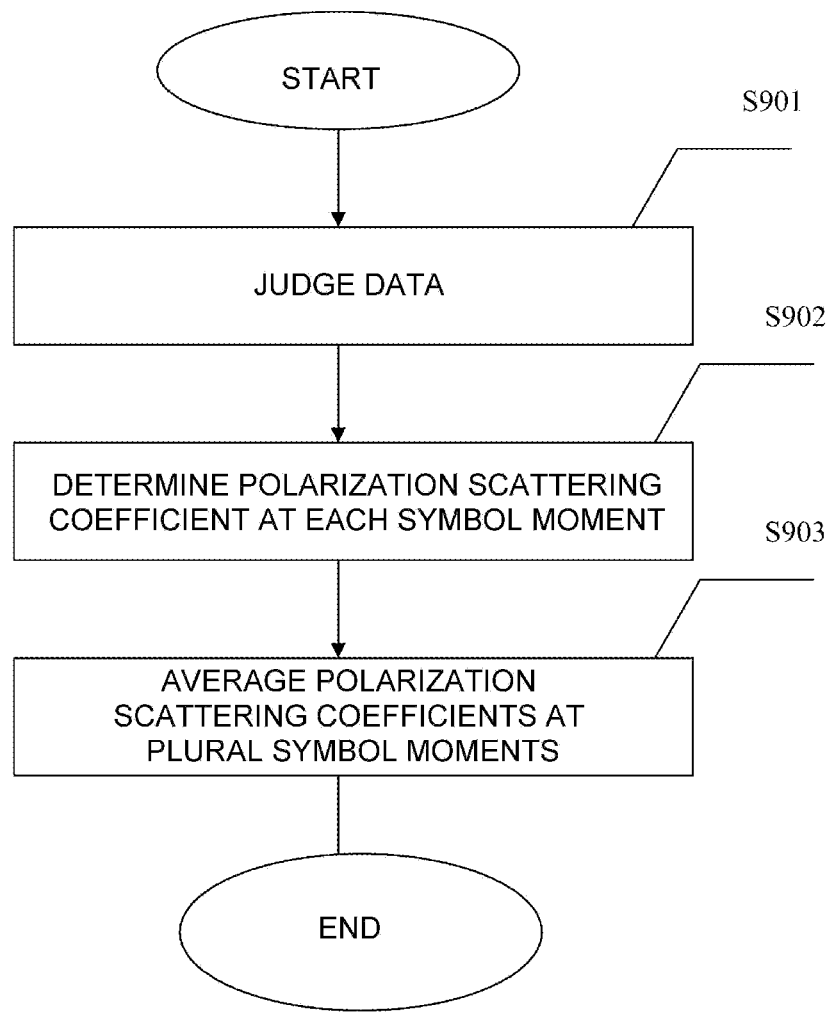
FIG. 9 schematically illustrates a flowchart of estimating polarization scattering coefficients in step S802 with respect to the signals in the first and second polarization states after the time sequence alignment, according to an embodiment.

FIG. 9 schematically illustrates a flowchart of estimating polarization scattering coefficients in step S802 with respect to the signals in the first and second polarization states after the time sequence alignment (e.g., the signal $R_h$ in the first polarization state and the signal $R_v$ transmitted simultaneously when the signal $R_h$ in the first polarization state is transmitted, with their time sequences aligned; the signal $R_h$ in the first polarization state and the signal $R_{v+1}$ transmitted at a symbol moment one symbol after the signal $R_h$ in the first polarization state is transmitted, with their time sequences aligned; or the signal $R_h$ in the first polarization state and the signal $R_{v-1}$ transmitted at a symbol moment one symbol before the signal $R_h$ in the first polarization state is transmitted, with their time sequences aligned), according to an embodiment.

As illustrated in FIG. 9, according to an embodiment, firstly in step S901, a data judgment is made to judge data modulated on the signal in the first polarization state and data modulated on the signal in the second polarization state. Next, in step S902, determining the polarization scattering coefficient of the polarization scattering by the signal in the first polarization state on the signal in the second polarization state, and the polarization scattering coefficient of the polarization scattering by the signal in the second polarization state on the signal in the first polarization state, at each symbol moment, in accordance with the data modulated on the signal in the first polarization state, the data modulated on the signal in the second polarization state, the signal in the first polarization state, and the signal in the second polarization state.

Finally in step S903, averaging polarization scattering coefficients of the polarization scatterings by the signal in the first polarization state on the signal in the second polarization state at plural symbol moments; and averaging polarization scattering coefficients of the polarization scatterings by the signal in the second polarization state on the signal in the first polarization state at plural symbol moments.

Figure 10:
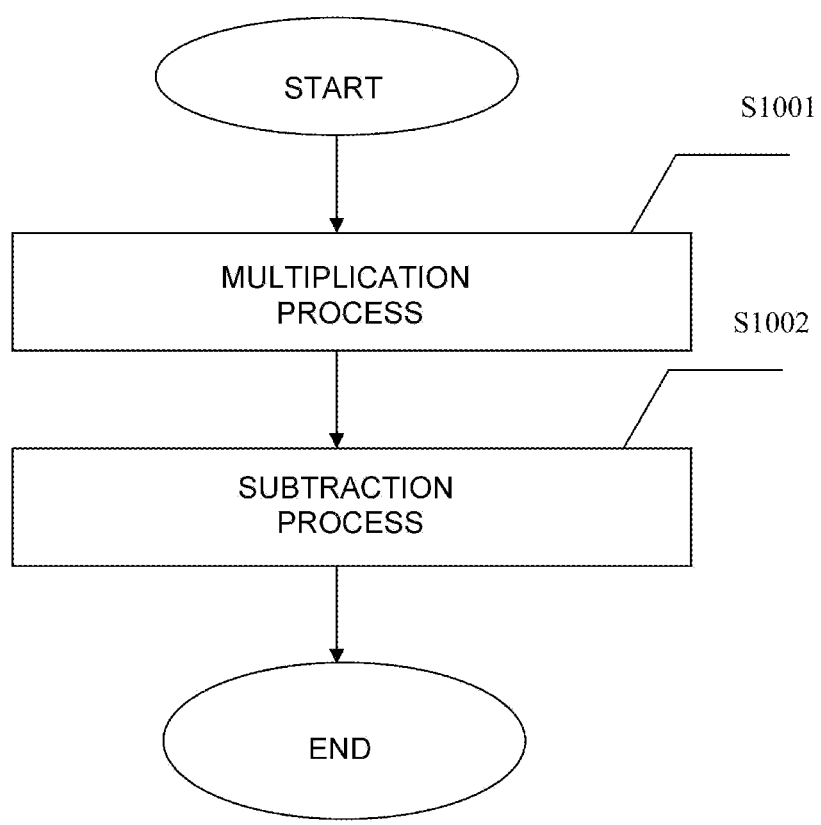
FIG. 10 schematically illustrates a flowchart of removing corresponding polarization scatterings in step S803 according to an embodiment.

FIG. 10 schematically illustrates a flowchart of removing corresponding polarization scatterings in step S803 according to an embodiment.

As illustrated in FIG. 10, firstly in step S1001, carrying out a multiplication, for example, multiplying the signal in the first polarization state or the data modulated thereon with the polarization scattering coefficient of the polarization scattering by the signal in the first polarization state on the signal in the second polarization state, when removing the scattering by the signal in the first polarization state on the signal in the second polarization state which is transmitted simultaneously when the signal in the first polarization state is transmitted. Next in step S1002, carrying out a subtraction, for example, subtracting a multiplication result obtained by step S1001 from the signal in the second polarization state, when removing the scattering by the signal in the first polarization state on the signal in the second polarization state which is transmitted simultaneously when the signal in the first polarization state is transmitted.

Obviously in step S803, each of the steps S1001 and S1002 in FIG. 10 can be performed for several times, and these steps may be performed in parallel.

The steps of multiplication and subtraction in FIG. 10 are described as above through an example of removing the polarization scattering by the signal in the first polarization state on the signal in the second polarization state which is transmitted simultaneously when the signal in the first polarization state is transmitted. For removing other polarization scattering, such as the polarization scattering by the signal in the first polarization state on the signal in the second polarization state which is transmitted at the moment one or more symbols before or after the signal in the first polarization state is transmitted, please refer to the descriptions of the polarization scattering removal unit in FIGS. 5A-7 for the multiplication and subtraction to be carried out, and herein are omitted.

Figure 11:
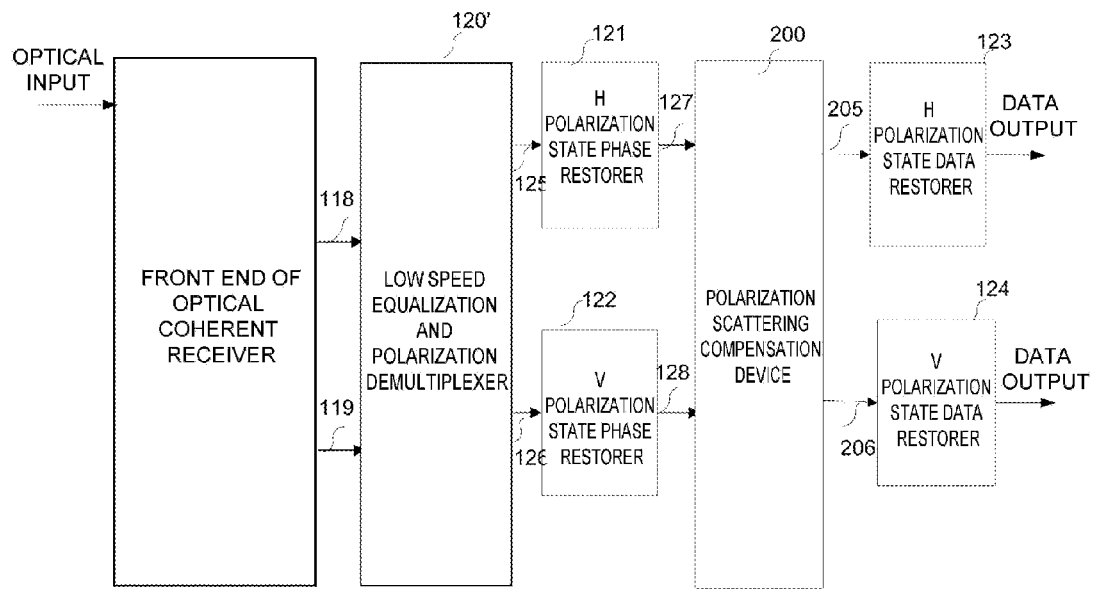
FIG. 11 schematically illustrates an optical coherent receiver according to another embodiment.

FIG. 11 schematically illustrates an optical coherent receiver according to another embodiment. As illustrated in FIG. 11, the optical coherent receiver differs from that in FIG. 2 in that the equalization and polarization demultiplexer 120 in FIG. 2 is replaced by a low speed equalization and polarization demultiplexer 120' in FIG. 11.

When the working parameters used for the polarization demultiplexing are not updated for every symbol, the typical tracking speed of the equalization and polarization demultiplexer is several tens of KHz, which is sufficient to track the polarization change in the optical fiber channel caused by any factor except the above mentioned nonlinear polarization scattering. But in the practical application, due to the limitation of the hardware speed, an equalization and polarization demultiplexer 801 usually adopts the parallel structure (Pfau T., etc., "Towards Real-Time Implementation of Coherent Optical Communication", paper OThj4, Processing of OFC 2009). In the parallel structure, the working parameters of the polarization demultiplexing are updated for every N symbols (N is the number of parallel channels in the parallel structure), rather than being updated for every symbol. Thus, the larger the value of N is, the lower the requirement of the hardware processing speed is, but the tracking speed of the equalization and polarization demultiplexer is decreased, thereby affecting the performance of the receiver. In the receiver using the equalization and polarization demultiplexer of the parallel structure, the polarization change that cannot be tracked due to the parallel structure of the equalization and polarization demultiplexer 120' may be eliminated by performing a polarization restoration of the signal using the polarization scattering compensation device according to the embodiment, so as to lower the requirement of the hardware processing speed without affecting the performance of the receiver.

Figure 12:
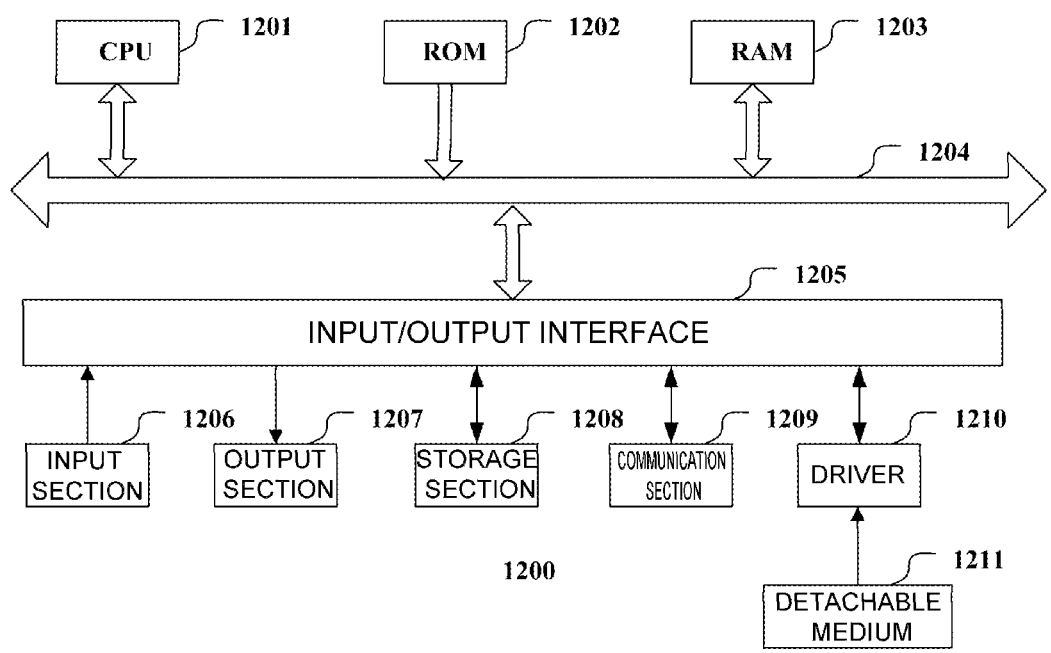
FIG. 12 schematically illustrates a block diagram of a computer capable of implementing the methods, devices and units according to the embodiments.

The respective constituent modules, units and subunits in the above device and the respective steps or processes in the above method may be configured through software, firmware, hardware or a combination thereof. The concrete means or manners for configuration are well known to a person skilled in the art, and herein are omitted. In case of an implementation through software or firmware, a program constituting the software is installed from a storage medium or network to a computer having a dedicated hardware structure (e.g., the general computer 1200 as illustrated in FIG. 12) or a computer incorporated into the system or device (e.g., the transmitter). The computer is capable of performing various functions when being installed with different programs.

FIG. 12 schematically illustrates a block diagram of a computer capable of implementing the methods and devices according to the embodiments.

In FIG. 12, a Central Processing Unit (CPU) 1201 performs various processing according to the program stored in a Read Only Memory (ROM) 1202 or the program loaded from a storage section 1208 to a Random Access Memory (RAM) 1203. Upon demand, the RAM 1203 also stores the data required for the various processing performed by the CPU 1201. The CPU 1201, the ROM 1202 and the RAM 1203 are connected to each other via a bus 1204. An input/output interface 1205 may also be connected to the bus 1204 upon demand.

The following parts may be connected to the input/output interface 1205 upon demand: an input section 1206 (including keyboard, mouse, etc.), an output section 1207 (including display such as Cathode-Ray Tube (CRT) and Liquid Crystal Display (LCD) and loudspeaker), a storage section 1208 (including hard disk, etc.) and a communication section 1209 (including network interface card such as LAN card, modem, etc.). The communication section 1209 for example performs a communication processing via a network such as the Internet. A driver 1210 may also be connected to the input/output interface 1205 upon demand. A detachable medium 1211, such as magnetic disk, optical disk, magnetic optical disk and semiconductor memory, may be mounted on the driver 1210 upon demand, so that the computer program read therefrom is installed in the storage section 1208 upon demand. The computer may only have the CPU 1201, the ROM 1202 and the RAM 1203 connected via the bus 1204.

In case the above series of processing being performed through software, the program constituting the software is installed from a network such as the Internet or a storage medium such as the detachable medium 1211.

A person skilled in the art shall be appreciated that the storage medium is not limited to the detachable medium 1211 that stores and distributes the program independently from the device to provide the user with the program as illustrated in FIG. 12. The example of the detachable medium 1211 includes magnetic disk (including floppy disk (registered trademark)), optical disk (including Compact Disk Read Only Memory (CD-ROM) and Digital Versatile Disk (DVD)), magnetic optical disk (including Mini Disk (MD) (registered trademark)) and semiconductor memory. Or the storage medium may be a hard disk contained in the ROM 1202 or the storage section 1208, in which programs are stored and distributed to the user together with the devices including them.

The embodiments also propose a program product that stores machine readable instruction codes. When the instruction codes are read and executed by a machine (such as a computer), the above mentioned method according to the embodiment can be performed.

Correspondingly, the storage medium for bearing the program product that stores the machine readable instruction codes is also included in the disclosure. The storage medium includes, but not limited to, floppy disk, optical disk, magnetic optical disk, memory card, memory stick, etc.

Excursus 1: A polarization scattering compensation device used for a receiver receiving data modulated on signal in first polarization state and signal in second polarization state and transmitted by a transmitter, the polarization scattering compensation device comprising:

a time sequence alignment unit for aligning time sequences of the signal in the first polarization state and the signal in the second polarization state which is transmitted by the transmitter simultaneously when the signal in the first polarization state is transmitted;

a polarization scattering estimation unit for estimating a scattering coefficient of a scattering by the signal in the first polarization state on the signal in the second polarization state, and a scattering coefficient of a scattering by the signal in the second polarization state on the signal in the first polarization state, with respect to the signals in the first polarization state and the second polarization state after the time sequence alignment; and a polarization scattering removal unit for removing the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state estimated by the polarization scattering estimation unit.

Excursus 2: The polarization scattering compensation device according to Excursus 1, wherein the time sequence alignment unit comprising:

a first delay register for delaying the signal in the first polarization state for a first predetermined symbol; and a second delay register for delaying the signal in the second polarization state for a second predetermined symbol.

Excursus 3: The polarization scattering compensation device according to Excursus 1, wherein the polarization scattering estimation unit comprising:

a first data judging unit for judging data modulated on the signal in the first polarization state;

a second data judging unit for judging data modulated on the signal in the second polarization state;

a polarization scattering coefficient calculation unit for calculating the scattering coefficient of the scattering by the signal in the first polarization state on the signal in the second polarization state, and the scattering coefficient of the scattering by the signal in the second polarization state on the signal in the first polarization state, at each symbol moment, in accordance with the signal in the first polarization state, the signal in the second polarization state, the data judged by the first data judging unit, and the data judged by the second data judging unit;

a first averaging unit for calculating an average value of the scattering coefficients of the scatterings by the signal in the second polarization state on the signal in the first polarization state at plural symbol moments; and a second averaging unit for calculating an average value of the scattering coefficients of the scatterings by the signal in the first polarization state on the signal in the second polarization state at plural symbol moments.

Excursus 4: The polarization scattering compensation device according to Excursus 3, wherein the polarization scattering removal unit comprising:

a first multiplier for multiplying a data value judged by the second data judging to unit with the average value obtained by the first averaging unit;

a first subtraction unit for subtracting a multiplication result obtained by the first multiplier from the signal in the first polarization state after the time sequence alignment;

a second multiplier for multiplying a data value judged by the first data judging unit with the average value obtained by the second averaging unit; and a second subtraction unit for subtracting a multiplication result obtained by the second multiplier from the signal in the second polarization state after the time sequence alignment.

Excursus 5: The polarization scattering compensation device according to Excursus 3, wherein the polarization scattering removal unit comprising:

a first multiplier for multiplying the signal in the second polarization state after the time sequence alignment with the average value obtained by the first averaging unit;

a first subtraction unit for subtracting a multiplication result obtained by the first multiplier from the signal in the first polarization state after the time sequence alignment;

a second multiplier for multiplying the signal in the first polarization state after the time sequence alignment with the average value obtained by the second averaging unit; and a second subtraction unit for subtracting a multiplication result obtained by the second multiplier from the signal in the second polarization state after the time sequence alignment.

Excursus 6: The polarization scattering compensation device according to Excursus 3, wherein the polarization scattering removal unit comprising:

an inverse matrix determination unit for determining an inverse matrix of a polarization scattering matrix between the signals in the first and second polarization states, according to the average values obtained by the first and second averaging units; and a multiplication unit for multiplying the inverse matrix determined by the inverse matrix determination unit with the signals in the first and second polarization states.

Excursus 7: The polarization scattering compensation device according to Excursus 1, further comprising:

a first additional time sequence alignment unit for aligning time sequences of the signal in the first polarization state and the signal in the second polarization state which is transmitted at the moment one or more symbols before the signal in the first polarization state is transmitted by the transmitter;

a first additional scattering estimation unit for estimating a scattering coefficient of a scattering by the signal in the first polarization state on the signal in the second polarization state transmitted at the moment one or more symbols before the signal in the first polarization state is transmitted by the transmitter, and a scattering coefficient of a scattering by the signal in the second polarization state transmitted at the moment one or more symbols before the signal in the first polarization state is transmitted by the transmitter on the signal in the first polarization state, with respect to the signal in the first polarization state and the signal in the second polarization state transmitted at the moment one or more symbols before the signal in the first polarization state is transmitted by the transmitter after the time sequence alignment; and a first additional scattering removal unit for removing the scattering by the signal in the first polarization state on the signal in the second polarization state transmitted at the moment one or more symbols before the signal in the first polarization state is transmitted by the transmitter, and the scattering by the signal in the second polarization state transmitted at the moment one or more symbols before the signal in the first polarization state is transmitted by the transmitter on the signal in the first polarization state, in accordance with the scattering coefficients estimated by the first additional scattering estimation unit.

Excursus 8: The polarization scattering compensation device according to Excursus 1, further comprising:

a second additional time sequence alignment unit for aligning time sequences of the signal in the first polarization state and the signal in the second polarization state transmitted at the moment one or more symbols after the signal in the first polarization state is transmitted by the transmitter;

a second additional scattering estimation unit for estimating a scattering coefficient of a scattering by the signal in the first polarization state on the signal in the second polarization state transmitted at the moment one or more symbols after the signal in the first polarization state is transmitted by the transmitter, and a to scattering coefficient of a scattering by the signal in the second polarization state transmitted at the moment one or more symbols after the signal in the first polarization state is transmitted by the transmitter on the signal in the first polarization state, with respect to the signal in the first polarization state and the signal in the second polarization state transmitted at the moment one or more symbols after the signal in the first polarization state is transmitted by the transmitter after the time sequence alignment; and a second additional scattering removal unit for removing the scattering by the signal in the first polarization state on the signal in the second polarization state transmitted at the moment one or more symbols after the signal in the first polarization state is transmitted by the transmitter, and the scattering by the signal in the second polarization state transmitted at the moment one or more symbols after the signal in the first polarization state is transmitted by the transmitter on the signal in the first polarization state, in accordance with the scattering coefficients estimated by the second additional scattering estimation unit.

Excursus 9: The polarization scattering compensation device according to Excursus 7, further comprising:

a second additional time sequence alignment unit for aligning time sequences of the signal in the first polarization state and the signal in the second polarization state transmitted at the moment one or more symbols after the signal in the first polarization state is transmitted by the transmitter;

a second additional scattering estimation unit for estimating a scattering coefficient of a scattering by the signal in the first polarization state on the signal in the second polarization state transmitted at the moment one or more symbols after the signal in the first polarization state is transmitted by the transmitter, and a scattering coefficient of a scattering by the signal in the second polarization state transmitted at the moment one or more symbols after the signal in the first polarization state is transmitted by the transmitter on the signal in the first polarization state, with respect to the signal in the first polarization state and the signal in the second polarization state transmitted at the moment one or more symbols after the signal in the first polarization state is transmitted by the transmitter after the time sequence alignment; and a second additional scattering removal unit for removing the scattering by the to signal in the first polarization state on the signal in the second polarization state transmitted at the moment one or more symbols after the signal in the first polarization state is transmitted by the transmitter, and the scattering by the signal in the second polarization state transmitted at the moment one or more symbols after the signal in the first polarization state is transmitted by the transmitter on the signal in the first polarization state, in accordance with the scattering coefficients estimated by the second additional scattering estimation unit.

Excursus 10: The polarization scattering compensation device according to Excursus 9, wherein the time sequence alignment unit comprising:

a first delay register for delaying the signal in the first polarization state for a first predetermined symbol; and a second delay register for delaying the signal in the second polarization state for a second predetermined symbol;

the first additional time sequence alignment unit comprising:

a first additional delay register for delaying the signal in the second polarization state transmitted at the moment one or more symbols before the signal in the first polarization state is transmitted by the transmitter, for a predetermined symbol;

the second additional time sequence alignment unit comprising:

a second additional delay register for delaying the signal in the second polarization state transmitted at the moment one or more symbols after the signal in the first polarization state is transmitted by the transmitter, for a predetermined symbol.

Excursus 11: The polarization scattering compensation device according to Excursus 9, wherein the first additional scattering removal unit comprising:

a first sequence forward-shift unit for forwardly shifting the signal in the first polarization state by one or more symbols;

a first additional multiplication unit for multiplying the signal in the first polarization state forwardly shifted by the first sequence forward-shift unit with the scattering coefficient of the scattering by the signal in the first polarization state on the signal in the second polarization state transmitted at the moment one or more symbols before the signal in the first polarization state is transmitted by the transmitter, which is estimated by the first additional scattering estimation unit;

a first additional subtraction unit for subtracting a multiplication result obtained by the first additional multiplication unit from the signal in the second polarization state;

a first sequence backward-shift unit for backwardly shifting the signal in the second polarization state by one or more symbols;

a second additional multiplication unit for multiplying the signal in the second polarization state backwardly shifted by the first sequence backward-shift unit with the scattering coefficient of the scattering by the signal in the second polarization state transmitted at the moment one or more symbols before the signal in the first polarization state is transmitted by the transmitter on the signal in the first polarization state, which is estimated by the first additional scattering estimation unit; and a second additional subtraction unit for subtracting a multiplication result obtained by the second additional multiplication unit from the signal in the first polarization state.

Excursus 12: The polarization scattering compensation device according to Excursus 9, wherein the first additional scattering estimation unit performs a data judgment for the signal in the first polarization state and the signal in the second polarization state transmitted at the moment one or more symbols before the signal in the first polarization state is transmitted by the transmitter, obtains data modulated on the signal in the first polarization state and data modulated on the signal in the second polarization state transmitted at the moment one or more symbols before the signal in the first polarization state is transmitted by the transmitter, so as to estimate the scattering coefficient of the scattering by the signal in the first polarization state on the signal in the second polarization state transmitted at the moment one or more symbols before the signal in the first polarization state is transmitted by the transmitter, and the scattering coefficient of the scattering by the signal in the second polarization state transmitted at the moment one or more symbols before the signal in the first polarization state is transmitted by the transmitter on the signal in the first polarization state, the first additional scattering removal unit comprising:

a first sequence forward-shift unit for forwardly shifting the data modulated on the signal in the first polarization state by one or more symbols;

a first additional multiplication unit for multiplying the data modulated on the signal in the first polarization state forwardly shifted by the first sequence forward-shift unit with the scattering coefficient of the scattering by the signal in the first polarization state on the signal in the second polarization state transmitted at the moment one or more symbols before the signal in the first polarization state is transmitted by the transmitter, which is estimated by the first additional scattering estimation unit;

a first additional subtraction unit for subtracting a multiplication result obtained by the first additional multiplication unit from the signal in the second polarization state;

a second sequence backward-shift unit for backwardly shifting the data modulated on the signal in the second polarization state by one or more symbols;

a second additional multiplication unit for multiplying the data modulated on the signal in the second polarization state backwardly shifted by the second sequence backward-shift unit with the scattering coefficient of the scattering by the signal in the second polarization state transmitted at the moment one or more symbols before the signal in the first polarization state is transmitted by the transmitter on the signal in the first polarization state, which is estimated by the first additional scattering estimation unit; and a second additional subtraction unit for subtracting a multiplication result obtained by the second additional multiplication unit from the signal in the first polarization state.

Excursus 13: The polarization scattering compensation device according to Excursus 11, wherein the second additional scattering removal unit comprising:

a second sequence backward-shift unit for backwardly shifting the signal in the first polarization state by one or more symbols;

a third additional multiplication unit for multiplying the signal in the first polarization state backwardly shifted by the second sequence backward-shift unit with the scattering coefficient of the scattering by the signal in the first polarization state on the signal in the second polarization state transmitted at the moment one or more symbols after the signal in the first polarization state is transmitted by the transmitter, which is estimated by the second additional scattering estimation unit;

a third additional subtraction unit for subtracting a multiplication result obtained by the third additional multiplication unit from the signal in the second polarization state;

a second sequence forward-shift unit for forwardly shifting the signal in the second polarization state by one or more symbols;

a fourth additional multiplication unit for multiplying the signal in the second polarization state forwardly shifted by the second sequence forward-shift unit with the scattering coefficient of the scattering by the signal in the second polarization state transmitted at the moment one or more symbols after the signal in the first polarization state is transmitted by the transmitter on the signal in the first polarization state, which is estimated by the first additional scattering estimation unit; and a fourth additional subtraction unit for subtracting a multiplication result obtained by the fourth additional multiplication unit from the signal in the first polarization state.

Excursus 14: The polarization scattering compensation device according to Excursus 11, wherein the second additional scattering estimation unit performs a data judgment for the signal in the first polarization state and the signal in the second polarization state transmitted at the moment one or more symbols after the signal in the first polarization state is transmitted by the transmitter, obtains data modulated on the signal in the first polarization state and data modulated on the signal in the second polarization state transmitted at the moment one or more symbols after the signal in the first polarization state is transmitted by the transmitter, so as to estimate the scattering coefficient of the scattering by the signal in the first polarization state on the signal in the second polarization state transmitted at the moment one or more symbols after the signal in the first polarization state is transmitted by the transmitter, and the scattering coefficient of the scattering by the signal in the second polarization state transmitted at the moment one or more symbols after the signal in the first polarization state is transmitted by the transmitter on the signal in the first polarization state, the second additional scattering removal unit comprising:

a second sequence backward-shift unit for backwardly shifting the data modulated on the signal in the first polarization state by one or more symbols;

a third additional multiplication unit for multiplying the data modulated on the signal in the first polarization state backwardly shifted by the second sequence backward-shift unit with the scattering coefficient of the scattering by the signal in the first polarization state on the signal in the second polarization state transmitted at the moment one or more symbols after the signal in the first polarization state is transmitted by the transmitter, which is estimated by the second additional scattering estimation unit;

a third additional subtraction unit for subtracting a multiplication result obtained by the first additional multiplication unit from the signal in the second polarization state;

a second sequence forward-shift unit for forwardly shifting the data modulated on the signal in the second polarization state by one or more symbols;

a fourth additional multiplication unit for multiplying the data modulated on the signal in the second polarization state forwardly shifted by the second sequence forward-shift unit with the scattering coefficient of the scattering by the signal in the second polarization state transmitted at the moment one or more symbols after the signal in the first polarization state is transmitted by the transmitter on the signal in the first polarization state, which is estimated by the second additional scattering estimation unit; and a fourth additional subtraction unit for subtracting a multiplication result obtained by the fourth additional multiplication unit from the signal in the first polarization state.

Excursus 15: The polarization scattering compensation device according to Excursus 13 or 14, wherein the first sequence forward-shift unit and the second sequence backward-shift unit are integrated with each other and composed of a first delayer and a first three-order delayer, the first delayer delays the signal in the first polarization state after the time sequence alignment for (D−2−m) symbol periods, wherein D symbol periods are symbol periods required for a polarization scattering estimation performed by the polarization scattering estimation unit, the first three-order delayer delays the signal having been delayed by the first delayer for 1+m symbol periods and 3+m symbol periods, respectively, thus backwardly shifting the signal in the first polarization state for the one or more symbols, and forwardly shifting the signal in the first polarization state for the one or more symbols, wherein m is a value obtained by subtracting one from the number of the one or more symbols.

Excursus 16: The polarization scattering compensation device according to Excursus 13 or 14, wherein the first sequence backward-shift unit and the second sequence forward-shift unit are integrated with each other and composed of a second delayer and a second three-order delayer, the second delayer delays the signal in the second polarization state after the time sequence alignment for (D−2−m) symbol periods, wherein D symbol periods are symbol periods required for a polarization scattering estimation performed by the polarization scattering estimation unit, the second three-order delayer delays the signal 702 having been delayed by the second delayer for 1+m symbol periods and 3+m symbol periods, respectively, thus backwardly shifting the signal in the second polarization state for the one or more symbols, and forwardly shifting the signal in the second polarization state for the one or more symbols, wherein m is a value obtained by subtracting one from the number of the one or more symbols.

Excursus 17: A coherent receiver, including an H polarization state phase restorer, a V polarization state phase restorer, an H polarization state data restorer, and a V polarization state data restorer, wherein the coherent receiver comprises the polarization scattering compensation device according to any of Excursuses 1 to 16, which receives signals from the H polarization state phase restorer and the V polarization state phase restorer, and outputs signals to the H polarization state data restorer and the V polarization state data restorer.

Excursus 18: The coherent receiver according to Excursus 17, wherein the coherent receiver uses a low speed equalization and polarization demultiplexer with parallel structure.

Excursus 19: A polarization scattering compensation method used for a receiver receiving data modulated on signal in first polarization state and signal in second polarization state and transmitted by a transmitter, the polarization scattering compensation method comprising:

a time sequence alignment process for aligning time sequences of the signal in the first polarization state and the signal in the second polarization state which is transmitted by the transmitter simultaneously when the signal in the first polarization state is transmitted;

a polarization scattering estimation process for estimating a scattering coefficient of a scattering by the signal in the first polarization state on the signal in the second polarization state, and a scattering coefficient of a scattering by the signal in the second polarization state on the signal in the first polarization state, with respect to the signals in the first and second polarization states after the time sequence alignment; and a polarization scattering removal process for removing the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state estimated by the polarization scattering estimation process.

Excursus 20: The polarization scattering compensation method according to Excursus 19, wherein the polarization scattering estimation process comprising:

a first data judging process for judging data modulated on the signal in the first polarization state;

a second data judging process for judging data modulated on the signal in the second polarization state;

a polarization scattering coefficient calculation process for calculating the scattering coefficient of the scattering by the signal in the first polarization state on the signal in the second polarization state, and the scattering coefficient of the scattering by the signal in the second polarization state on the signal in the first polarization state, at each symbol moment, in accordance with the signal in the first polarization state, the signal in the second polarization state, the data judged by the first data judging process, and the data judged by the second data judging process;

a first averaging process for calculating an average value of the scattering coefficients of the scatterings by the signal in the second polarization state on the signal in the first polarization state at plural symbol moments; and a second averaging process for calculating an average value of the scattering coefficients of the scatterings by the signal in the first polarization state on the signal in the second polarization state at plural symbol moments.

Excursus 21: The polarization scattering compensation method according to Excursus 20, wherein the polarization scattering removal process comprising:

a first multiplication process for multiplying a data value judged by the second data judging process with the average value obtained by the first averaging process;

a first subtraction process for subtracting a multiplication result obtained by the first multiplication process from the signal in the first polarization state after the time sequence alignment;

a second multiplication process for multiplying a data value judged by the first data judging process with the average value obtained by the second averaging process; and a second subtraction process for subtracting a multiplication result obtained by the second multiplication process from the signal in the second polarization state after the time sequence alignment.

Excursus 22: The polarization scattering compensation method according to Excursus 20, wherein the polarization scattering removal process comprising:

a first multiplication process for multiplying the signal in the second polarization state after the time sequence alignment with the average value obtained by the first averaging process;

a first subtraction process for subtracting a multiplication result obtained by the first multiplication process from the signal in the first polarization state after the time sequence alignment;

a second multiplication process for multiplying the signal in the first polarization state after the time sequence alignment with the average value obtained by the second averaging process; and a second subtraction process for subtracting a multiplication result obtained by the second multiplication process from the signal in the second polarization state after the time sequence alignment.

Excursus 23: The polarization scattering compensation method according to Excursus 20, wherein the polarization scattering removal process comprising:

an inverse matrix determination process for determining an inverse matrix of a polarization scattering matrix between the signals in the first and second polarization states, according to the average values obtained by the first and second averaging processes; and a multiplication process for multiplying the inverse matrix determined by the inverse matrix determination process with the signals in the first and second polarization states.

Excursus 24: The polarization scattering compensation method according to Excursus 19, further comprising:

a first additional time sequence alignment process for aligning time sequences of the signal in the first polarization state and the signal in the second polarization state transmitted at the moment one or more symbols before the signal in the first polarization state is transmitted by the transmitter;

a first additional scattering estimation process for estimating a scattering coefficient of a scattering by the signal in the first polarization state on the signal in the second polarization state transmitted at the moment one or more symbols before the signal in the first polarization state is transmitted by the transmitter, and a scattering coefficient of a scattering by the signal in the second polarization state transmitted at the moment one or more symbols before the signal in the first polarization state is transmitted by the transmitter on the signal in the first polarization state, with respect to the signal in the first polarization state and the signal in the second polarization state transmitted at the moment one or more symbols before the signal in the first polarization state is transmitted by the transmitter after the time sequence alignment; and a first additional scattering removal process for removing the scattering by the signal in the first polarization state on the signal in the second polarization state transmitted at the moment one or more symbols before the signal in the first polarization state is transmitted by the transmitter, and the scattering by the signal in the second polarization state transmitted at the moment one or more symbols before the signal in the first polarization state is transmitted by the transmitter on the signal in the first polarization state, in accordance with the scattering coefficients estimated by the first additional scattering estimation process.

Excursus 25: The polarization scattering compensation method according to Excursus 19, further comprising:

a second additional time sequence alignment process for aligning time sequences of the signal in the first polarization state and the signal in the second polarization state transmitted at the moment one or more symbols after the signal in the first polarization state is transmitted by the transmitter;

a second additional scattering estimation process for estimating a scattering coefficient of a scattering by the signal in the first polarization state on the signal in the second polarization state transmitted at the moment one or more symbols after the signal in the first polarization state is transmitted by the transmitter, and a scattering coefficient of a scattering by the signal in the second polarization state transmitted at the moment one or more symbols after the signal in the first polarization state is transmitted by the transmitter on the signal in the first polarization state, with respect to the signal in the first polarization state and the signal in the second polarization state transmitted at the moment one or more symbols after the signal in the first polarization state is transmitted by the transmitter after the time sequence alignment; and a second additional scattering removal process for removing the scattering by the signal in the first polarization state on the signal in the second polarization state transmitted at the moment one or more symbols after the signal in the first polarization state is transmitted by the transmitter, and the scattering by the signal in the second polarization state transmitted at the moment one or more symbols after the signal in the first polarization state is transmitted by the transmitter on the signal in the first polarization state, in accordance with the scattering coefficients estimated by the second additional scattering estimation process.

Excursus 26: The polarization scattering compensation method according to Excursus 24, further comprising:

a second additional time sequence alignment process for aligning time sequences of the signal in the first polarization state and the signal in the second polarization state transmitted at the moment one or more symbols after the signal in the first polarization state is transmitted by the transmitter;

a second additional scattering estimation process for estimating a scattering coefficient of a scattering by the signal in the first polarization state on the signal in the second polarization state transmitted at the moment one or more symbols after the signal in the first polarization state is transmitted by the transmitter, and a scattering coefficient of a scattering by the signal in the second polarization state transmitted at the moment one or more symbols after the signal in the first polarization state is transmitted by the transmitter on the signal in the first polarization state, with respect to the signal in the first polarization state and the signal in the second polarization state transmitted at the moment one or more symbols after the signal in the first polarization state is transmitted by the transmitter after the time sequence alignment; and a second additional scattering removal process for removing the scattering by the signal in the first polarization state on the signal in the second polarization state transmitted at the moment one or more symbols after the signal in the first polarization state is transmitted by the transmitter, and the scattering by the signal in the second polarization state transmitted at the moment one or more symbols after the signal in the first polarization state is transmitted by the transmitter on the signal in the first polarization state, in accordance with the scattering coefficients estimated by the second additional scattering estimation process.

Excursus 27: The polarization scattering compensation method according to Excursus 26, wherein the time sequence alignment process comprising:

a first delay registration process for delaying the signal in the first polarization state for a first predetermined symbol; and a second delay registration process for delaying the signal in the second polarization state for a second predetermined symbol;

the first additional time sequence alignment process comprising:

a first additional delay registration process for delaying the signal in the second polarization state transmitted at the moment one or more symbols before the signal in the first polarization state is transmitted by the transmitter, for a predetermined symbol;

the second additional time sequence alignment unit comprising:

a second additional delay registration process for delaying the signal in the second polarization state transmitted at the moment one or more symbols after the signal in the first polarization state is transmitted by the transmitter, for a predetermined symbol.

Excursus 28: The polarization scattering compensation method according to Excursus 26, wherein the first additional scattering removal process comprising:

a first sequence forward-shift process for forwardly shifting the signal in the first polarization state by one or more symbols;

a first additional multiplication process for multiplying the signal in the first polarization state forwardly shifted by the first sequence forward-shift process with the scattering coefficient of the scattering by the signal in the first polarization state on the signal in the second polarization state transmitted at the moment one or more symbols before the signal in the first polarization state is transmitted by the transmitter, which is estimated by the first additional scattering estimation process;

a first additional subtraction process for subtracting a multiplication result obtained by the first additional multiplication process from the signal in the second polarization state;

a first sequence backward-shift process for backwardly shifting the signal in the second polarization state by one or more symbols;

a second additional multiplication process for multiplying the signal in the second polarization state backwardly shifted by the first sequence backward-shift process with the scattering coefficient of the scattering by the signal in the second polarization state transmitted at the moment one or more symbols before the signal in the first polarization state is transmitted by the transmitter on the signal in the first polarization state, which is estimated by the first additional scattering estimation process; and a second additional subtraction process for subtracting a multiplication result obtained by the second additional multiplication process from the signal in the first polarization state.

Excursus 29: The polarization scattering compensation method according to Excursus 26, wherein the first additional scattering estimation process performs a data judgment for the signal in the first polarization state and the signal in the second polarization state transmitted at the moment one or more symbols before the signal in the first polarization state is transmitted by the transmitter, obtains data modulated on the signal in the first polarization state and data modulated on the signal in the second polarization state transmitted at the moment one or more symbols before the signal in the first polarization state is transmitted by the transmitter, so as to estimate the scattering coefficient of the scattering by the signal in the first polarization state on the signal in the second polarization state transmitted at the moment one or more symbols before the signal in the first polarization state is transmitted by the transmitter, and the scattering coefficient of the scattering by the signal in the second polarization state transmitted at the moment one or more symbols before the signal in the first polarization state is transmitted by the transmitter on the signal in the first polarization state, the first additional scattering removal process comprising:

a first sequence forward-shift process for forwardly shifting the data modulated on the signal in the first polarization state by one or more symbols;

a first additional multiplication process for multiplying the data modulated on the signal in the first polarization state forwardly shifted by the first sequence forward-shift process with the scattering coefficient of the scattering by the signal in the first polarization state on the signal in the second polarization state transmitted at the moment one or more symbols before the signal in the first polarization state is transmitted by the transmitter, which is estimated by the first additional scattering estimation process;

a first additional subtraction process for subtracting a multiplication result obtained by the first additional multiplication process from the signal in the second polarization state;

a second sequence backward-shift process for backwardly shifting the data modulated on the signal in the second polarization state by one or more symbols;

a second additional multiplication process for multiplying the data modulated on the signal in the second polarization state backwardly shifted by the second sequence backward-shift process with the scattering coefficient of the scattering by the signal in the second polarization state transmitted at the moment one or more symbols before the signal in the first polarization state is transmitted by the transmitter on the signal in the first polarization state, which is estimated by the first additional scattering estimation process; and a second additional subtraction process for subtracting a multiplication result obtained by the second additional multiplication process from the signal in the first polarization state.

Excursus 30: The polarization scattering compensation method according to Excursus 28, wherein the second additional scattering removal process comprising a second sequence backward-shift process for backwardly shifting the signal in the first polarization state by one or more symbols;

a third additional multiplication process for multiplying the signal in the first polarization state backwardly shifted by the second sequence backward-shift process with the scattering coefficient of the scattering by the signal in the first polarization state on the signal in the second polarization state transmitted at the moment one or more symbols after the signal in the first polarization state is transmitted by the transmitter, which is estimated by the second additional scattering estimation process;

a third additional subtraction process for subtracting a multiplication result obtained by the third additional multiplication process from the signal in the second polarization state;

a second sequence forward-shift process for forwardly shifting the signal in the second polarization state by one or more symbols;

a fourth additional multiplication process for multiplying the signal in the second polarization state forwardly shifted by the second sequence forward-shift process with the scattering coefficient of the scattering by the signal in the second polarization state transmitted at the moment one or more symbols after the signal in the first polarization state is transmitted by the transmitter on the signal in the first polarization state, which is estimated by the first additional scattering estimation process; and a fourth additional subtraction process for subtracting a multiplication result obtained by the fourth additional multiplication process from the signal in the first polarization state.

Excursus 31: The polarization scattering compensation method according to Excursus 28, wherein the second additional scattering estimation process performs a data judgment for the signal in the first polarization state and the signal in the second polarization state transmitted at the moment one or more symbols after the signal in the first polarization state is transmitted by the transmitter, obtains data modulated on the signal in the first polarization state and data modulated on the signal in the second polarization state transmitted at the moment one or more symbols after the signal in the first polarization state is transmitted by the transmitter, so as to estimate the scattering coefficient of the scattering by the signal in the first polarization state on the signal in the second polarization state transmitted at the moment one or more symbols after the signal in the first polarization state is transmitted by the transmitter, and the scattering coefficient of the scattering by the signal in the second polarization state transmitted at the moment one or more symbols after the signal in the first polarization state is transmitted by the transmitter on the signal in the first polarization state, the second additional scattering removal process comprising:

a second sequence backward-shift process for backwardly shifting the data modulated on the signal in the first polarization state by one or more symbols;

a third additional multiplication process for multiplying the data modulated on the signal in the first polarization state backwardly shifted by the second sequence backward-shift process with the scattering coefficient of the scattering by the signal in the first polarization state on the signal in the second polarization state transmitted at the moment one or more symbols after the signal in the first polarization state is transmitted by the transmitter, which is estimated by the second additional scattering estimation process;

a third additional subtraction process for subtracting a multiplication result obtained by the first additional multiplication process from the signal in the second polarization state;

a second sequence forward-shift process for forwardly shifting the data modulated on the signal in the second polarization state by one or more symbols;

a fourth additional multiplication process for multiplying the data modulated on the signal in the second polarization state forwardly shifted by the second sequence forward-shift process with the scattering coefficient of the scattering by the signal in the second polarization state transmitted at the moment one or more symbols after the signal in the first polarization state is transmitted by the transmitter on the signal in the first polarization state, which is estimated by the second additional scattering estimation process; and a fourth additional subtraction process for subtracting a multiplication result obtained by the fourth additional multiplication process from the signal in the first polarization state.

In the above descriptions of the embodiments, features described and/or illustrated with respect to one embodiment may be used in the same or similar way in one or more other embodiments to combine or replace the features of other embodiments.

To be noted, the term "include/comprise" or "including/comprising" herein refers to existence of feature, integer, step or assembly, not excluding existence or addition of one or more other features, integer, steps, assemblies or a combination thereof.

In addition, the method is not limited to be executed according to the time order as described herein, and can be executed in other time sequentially, concurrently or independently. Thus the execution order of the method as described herein does not limit the technical scope.

What is claimed is:

1. A polarization scattering compensation device used for a receiver receiving data modulated on a signal in first polarization state and a signal in second polarization state and transmitted by a transmitter, the polarization scattering compensation device comprising:

a time sequence alignment unit to align time sequences of the signal in the first polarization state and the signal in the second polarization state which is transmitted by the transmitter simultaneously when the signal in the first polarization state is transmitted;

a polarization scattering estimation unit to estimate a scattering coefficient of a scattering by the signal in the first polarization state on the signal in the second polarization state, and a scattering coefficient of a scattering by the signal in the second polarization state on the signal in the first polarization state, with respect to the signals in the first polarization state and the second polarization state after the time sequence alignment; and a polarization scattering removal unit to remove the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state estimated by the polarization scattering estimation unit.

2. The polarization scattering compensation device according to claim 1, wherein the polarization scattering estimation unit comprising:

a first data judging unit to judge data modulated on the signal in the first polarization state;

a second data judging unit to judge data modulated on the signal in the second polarization state;

a polarization scattering coefficient calculation unit to calculate the scattering coefficient of the scattering by the signal in the first polarization state on the signal in the second polarization state, and the scattering coefficient of the scattering by the signal in the second polarization state on the signal in the first polarization state, at each symbol moment, in accordance with the signal in the first polarization state, the signal in the second polarization state, the data judged by the first data judging unit, and the data judged by the second data judging unit;

a first averaging unit to calculate an average value of the scattering coefficients of the scatterings by the signal in the second polarization state on the signal in the first polarization state at plural symbol moments; and a second averaging unit to calculate an average value of the scattering coefficients of the scatterings by the signal in the first polarization state on the signal in the second polarization state at plural symbol moments.

3. The polarization scattering compensation device according to claim 2, wherein the polarization scattering removal unit comprising:

a first multiplier to multiply the signal in the second polarization state after the time sequence alignment with the average value obtained by the first averaging unit;

a first subtraction unit to subtract a multiplication result obtained by the first multiplier from the signal in the first polarization state after the time sequence alignment;

a second multiplier to multiply the signal in the first polarization state after the time sequence alignment with the average value obtained by the second averaging unit; and a second subtraction unit to subtract a multiplication result obtained by the second multiplier from the signal in the second polarization state after the time sequence alignment.

4. The polarization scattering compensation device according to claim 1, further comprising:

a first additional time sequence alignment unit to align time sequences of the signal in the first polarization state and the signal in the second polarization state which is transmitted at the moment one or more symbols transmitted before the signal in the first polarization state is transmitted by the transmitter;

a first additional scattering estimation unit to estimate a scattering coefficient of a scattering by the signal in the first polarization state on the signal in the second polarization state transmitted at the moment one or more symbols transmitted before the signal in the first polarization state is transmitted by the transmitter, and a scattering coefficient of a scattering by the signal in the second polarization state transmitted at the moment one or more symbols transmitted before the signal in the first polarization state is transmitted by the transmitter on the signal in the first polarization state, with respect to the signal in the first polarization state and the signal in the second polarization state transmitted at the moment one or more symbols transmitted before the signal in the first polarization state is transmitted by the transmitter after the time sequence alignment;

a first additional scattering removal unit to estimate the scattering by the signal in the first polarization state on the signal in the second polarization state transmitted at the moment one or more symbols transmitted before the signal in the first polarization state is transmitted by the transmitter, and the scattering by the signal in the second polarization state transmitted at the moment one or more symbols transmitted before the signal in the first polarization state is transmitted by the transmitter on the signal in the first polarization state, in accordance with the scattering coefficients estimated by the first additional scattering estimation unit;

a second additional time sequence alignment unit to align time sequences of the signal in the first polarization state and the signal in the second polarization state transmitted at the moment one or more symbols transmitted after the signal in the first polarization state is transmitted by the transmitter;

a second additional scattering estimation unit to estimate a scattering coefficient of a scattering by the signal in the first polarization state on the signal in the second polarization state transmitted at the moment one or more symbols transmitted after the signal in the first polarization state is transmitted by the transmitter, and a scattering coefficient of a scattering by the signal in the second polarization state transmitted at the moment one or more symbols transmitted after the signal in the first polarization state is transmitted by the transmitter on the signal in the first polarization state, with respect to the signal in the first polarization state and the signal in the second polarization state transmitted at the moment one or more symbols transmitted after the signal in the first polarization state is transmitted by the transmitter after the time sequence alignment; and a second additional scattering removal unit to remove the scattering by the signal in the first polarization state on the signal in the second polarization state transmitted at the moment one or more symbols transmitted after the signal in the first polarization state is transmitted by the transmitter, and the scattering by the signal in the second polarization state transmitted at the moment one or more symbols transmitted after the signal in the first polarization state is transmitted by the transmitter on the signal in the first polarization state, in accordance with the scattering coefficients estimated by the second additional scattering estimation unit.

5. The polarization scattering compensation device according to claim 4, wherein, the first additional scattering removal unit comprising:

a first sequence forward-shift unit to forwardly shift the signal in the first polarization state by one or more symbols;

a first additional multiplication unit to multiply the signal in the first polarization state forwardly shifted with the scattering coefficient of the scattering by the signal in the first polarization state on the signal in the second polarization state transmitted at the moment one or more symbols transmitted before the signal in the first polarization state is transmitted by the transmitter;

a first additional subtraction unit to subtract a multiplication result obtained by the first additional multiplication unit from the signal in the second polarization state;

a first sequence backward-shift unit to backwardly shift the signal in the second polarization state by one or more symbols;

a second additional multiplication unit to multiply the signal in the second polarization state backwardly shifted with the scattering coefficient of the scattering by the signal in the second polarization state transmitted at the moment one or more symbols transmitted before the signal in the first polarization state is transmitted by the transmitter on the signal in the first polarization state;

a second additional subtraction unit to subtract a multiplication result obtained by the second additional multiplication unit from the signal in the first polarization state, the second additional scattering removal unit comprising:

a second sequence backward-shift unit to backwardly shift the signal in the first polarization state by one or more symbols;

a third additional multiplication unit to multiply the signal in the first polarization state backwardly shifted with the scattering coefficient of the scattering by the signal in the first polarization state on the signal in the second polarization state transmitted at the moment one or more symbols transmitted after the signal in the first polarization state is transmitted by the transmitter;

a third additional subtraction unit to subtract a multiplication result obtained by the third additional multiplication unit from the signal in the second polarization state;

a second sequence forward-shift unit to forwardly shift the signal in the second polarization state by one or more symbols;

a fourth additional multiplication unit to multiply the signal in the second polarization state forwardly shifted with the scattering coefficient of the scattering by the signal in the second polarization state transmitted at the moment one or more symbols transmitted after the signal in the first polarization state is transmitted by the transmitter on the signal in the first polarization state; and a fourth additional subtraction unit to subtract a multiplication result obtained by the fourth additional multiplication unit from the signal in the first polarization state.

6. A polarization scattering compensation method used for a receiver receiving data modulated on signal in first polarization state and signal in second polarization state and transmitted by a transmitter, the polarization scattering compensation method comprising:

a time sequence alignment process to align time sequences of the signal in the first polarization state and the signal in the second polarization state which is transmitted by the transmitter simultaneously when the signal in the first polarization state is transmitted;

a polarization scattering estimation process to estimate a scattering coefficient of a scattering by the signal in the first polarization state on the signal in the second polarization state, and a scattering coefficient of a scattering by the signal in the second polarization state on the signal in the first polarization state, with respect to the signals in the first and second polarization states after the time sequence alignment; and a polarization scattering removal process to remove the scattering by the signal in the first polarization state on the signal in the second polarization state, and the scattering by the signal in the second polarization state on the signal in the first polarization state, in accordance with the scattering coefficient of the scattering by the signal in the first polarization state on the signal in the second polarization state, and the scattering coefficient of the scattering by the signal in the second polarization state on the signal in the first polarization state.

7. The polarization scattering compensation method according to claim 6, wherein, the polarization scattering estimation process comprising:

a first data judging process to judge data modulated on the signal in the first polarization state;

a second data judging process to judge data modulated on the signal in the second polarization state;

a polarization scattering coefficient calculation process to calculate the scattering coefficient of the scattering by the signal in the first polarization state on the signal in the second polarization state, and the scattering coefficient of the scattering by the signal in the second polarization state on the signal in the first polarization state, at each symbol moment, in accordance with the signal in the first polarization state, the signal in the second polarization state, the data judged by the first data judging process, and the data judged by the second data judging process;

a first averaging process to calculate an average value of the scattering coefficients of the scatterings by the signal in the second polarization state on the signal in the first polarization state at plural symbol moments; and a second averaging process to calculate an average value of the scattering coefficients of the scatterings by the signal in the first polarization state on the signal in the second polarization state at plural symbol moments.

8. The polarization scattering compensation method according to claim 7, wherein the polarization scattering removal process comprising:

a first multiplication process to multiply the signal in the second polarization state after the time sequence alignment with the average value obtained by the first averaging process;

a first subtraction process to subtract a multiplication result obtained by the first multiplication process from the signal in the first polarization state after the time sequence alignment;

a second multiplication process to multiply the signal in the first polarization state after the time sequence alignment with the average value obtained by the second averaging process; and a second subtraction process to subtract a multiplication result obtained by the second multiplication process from the signal in the second polarization state after the time sequence alignment.

9. The polarization scattering compensation method according to claim 6, further comprising:

a first additional time sequence alignment process to align time sequences of the signal in the first polarization state and the signal in the second polarization state transmitted at the moment one or more symbols transmitted before the signal in the first polarization state is transmitted by the transmitter;

a first additional scattering estimation process to estimate a scattering coefficient of a scattering by the signal in the first polarization state on the signal in the second polarization state transmitted at the moment one or more symbols transmitted before the signal in the first polarization state is transmitted by the transmitter, and a scattering coefficient of a scattering by the signal in the second polarization state transmitted at the moment one or more symbols transmitted before the signal in the first polarization state is transmitted by the transmitter on the signal in the first polarization state, with respect to the signal in the first polarization state and the signal in the second polarization state transmitted at the moment one or more symbols transmitted before the signal in the first polarization state is transmitted by the transmitter after the time sequence alignment;

a first additional scattering removal process to remove the scattering by the signal in the first polarization state on the signal in the second polarization state transmitted at the moment one or more symbols transmitted before the signal in the first polarization state is transmitted by the transmitter, and the scattering by the signal in the second polarization state transmitted at the moment one or more symbols transmitted before the signal in the first polarization state is transmitted by the transmitter on the signal in the first polarization state, in accordance with the scattering coefficients estimated by the first additional scattering estimation process;

a second additional time sequence alignment process to align time sequences of the signal in the first polarization state and the signal in the second polarization state transmitted at the moment one or more symbols transmitted after the signal in the first polarization state is transmitted by the transmitter;

a second additional scattering estimation process to estimate a scattering coefficient of a scattering by the signal in the first polarization state on the signal in the second polarization state transmitted at the moment one or more symbols transmitted after the signal in the first polarization state is transmitted by the transmitter, and a scattering coefficient of a scattering by the signal in the second polarization state transmitted at the moment one or more symbols transmitted after the signal in the first polarization state is transmitted by the transmitter on the signal in the first polarization state, with respect to the signal in the first polarization state and the signal in the second polarization state transmitted at the moment one or more symbols transmitted after the signal in the first polarization state is transmitted by the transmitter after the time sequence alignment; and a second additional scattering removal process to remove the scattering by the signal in the first polarization state on the signal in the second polarization state transmitted at the moment one or more symbols transmitted after the signal in the first polarization state is transmitted by the transmitter, and the scattering by the signal in the second polarization state transmitted at the moment one or more symbols transmitted after the signal in the first polarization state is transmitted by the transmitter on the signal in the first polarization state, in accordance with the scattering coefficients estimated by the second additional scattering estimation process.

10. The polarization scattering compensation method according to claim 9, wherein the first additional scattering removal process comprising:
- a first sequence forward-shift process to forwardly shift the signal in the first polarization state by one or more symbols;
- a first additional multiplication process to multiply the signal in the first polarization state forwardly shifted with the scattering coefficient of the scattering by the signal in the first polarization state on the signal in the second polarization state transmitted at the moment one or more symbols transmitted before the signal in the first polarization state is transmitted by the transmitter;
- a first additional subtraction process to subtract a multiplication result obtained by the first additional multiplication process from the signal in the second polarization state;
- a first sequence backward-shift process to backwardly shift the signal in the second polarization state by one or more symbols;
- a second additional multiplication process to multiply the signal in the second polarization state backwardly shifted with the scattering coefficient of the scattering by the signal in the second polarization state transmitted at the moment one or more symbols transmitted before the signal in the first polarization state is transmitted by the transmitter on the signal in the first polarization state;
- a second additional subtraction process to subtract a multiplication result obtained by the second additional multiplication process from the signal in the first polarization state;

the second additional scattering removal process comprising:
- a second sequence backward-shift process to backwardly shift the signal in the first polarization state by one or more symbols;
- a third additional multiplication process to multiply the signal in the first polarization state backwardly shifted with the scattering coefficient of the scattering by the signal in the first polarization state on the signal in the second polarization state transmitted at the moment one or more symbols transmitted after the signal in the first polarization state is transmitted by the transmitter;
- a third additional subtraction process to subtract a multiplication result obtained by the third additional multiplication process from the signal in the second polarization state;
- a second sequence forward-shift process to forwardly shift the signal in the second polarization state by one or more symbols;
- a fourth additional multiplication process to multiply the signal in the second polarization state forwardly shifted with the scattering coefficient of the scattering by the signal in the second polarization state transmitted at the moment one or more symbols transmitted after the signal in the first polarization state is transmitted by the transmitter on the signal in the first polarization state estimated by the first additional scattering estimation process; and
- a fourth additional subtraction process to subtract a multiplication result obtained by the fourth additional multiplication process from the signal in the first polarization state.

\* \* \* \* \*